(12) United States Patent
Kikuchi et al.

(10) Patent No.: US 10,859,790 B2
(45) Date of Patent: Dec. 8, 2020

(54) FOCUSING APPARATUS, CONTROL METHOD OF FOCUSING APPARATUS, AND RECORDING MEDIUM STORING FOCUS ADJUSTMENT PROGRAM

(71) Applicant: Olympus Corporation, Hachioji (JP)

(72) Inventors: Tetsuo Kikuchi, Hachioji (JP); Kazumasa Kunugi, Hachioji (JP); Yukie Yamazaki, Hachioji (JP); Tomohiro Hoshino, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/423,110

(22) Filed: May 27, 2019

(65) Prior Publication Data
US 2019/0278052 A1    Sep. 12, 2019

Related U.S. Application Data

(63) Continuation of application No. PCT/JP2017/036713, filed on Oct. 10, 2017.

(30) Foreign Application Priority Data

Nov. 28, 2016  (JP) ................. 2016-230273

(51) Int. Cl.
*G02B 7/09*     (2006.01)
*G03B 13/36*    (2006.01)
(Continued)

(52) U.S. Cl.
CPC ............ *G02B 7/09* (2013.01); *G02B 7/28* (2013.01); *G02B 7/34* (2013.01); *G03B 13/36* (2013.01);
(Continued)

(58) Field of Classification Search
CPC ... G02B 7/09; G02B 7/28; G02B 7/34; G02B 7/36; G03B 13/36; G03B 15/00;
(Continued)

(56) References Cited

U.S. PATENT DOCUMENTS 6,311,019 B1     10/2001  Ide
2005/0041839 A1   2/2005  Saitou et al.
(Continued)

FOREIGN PATENT DOCUMENTS

JP    2000-258682    9/2000
JP    2005-65021     3/2005
(Continued)

OTHER PUBLICATIONS

International Preliminary Report on Patentability from corresponding International Application No. PCT/JP2017/036713, dated Jun. 6, 2019 (9 pgs.).

(Continued)

*Primary Examiner* — Albert H Culter
(74) *Attorney, Agent, or Firm* — John C. Pokotylo; Pokotylo Patent Services

(57) ABSTRACT

A focusing apparatus includes processing circuitry. The processing circuitry is configured to select an AF area indicating a defocus amount closest to a calculated moving object prediction equation among the latest defocus amounts detected for the plurality of AF areas, in a case where the moving object prediction equation is determined as being established, and the driving direction is determined as being the close-range direction. The moving object prediction equation is determined as being established when a divergence amount between the defocus amount equal to or larger than a predetermined number included in the history and the calculated moving object prediction equation is equal to or lower than a predetermined value.

20 Claims, 10 Drawing Sheets

(51) Int. Cl.
  *G03B 15/00*     (2006.01)
  *G02B 7/28*      (2006.01)
  *H04N 5/232*     (2006.01)
  *G02B 7/34*      (2006.01)
  *G02B 7/36*      (2006.01)
  *H04N 5/369*     (2011.01)

(52) U.S. Cl.
  CPC ............. *G03B 15/00* (2013.01); *H04N 5/232* (2013.01); *H04N 5/23212* (2013.01); *H04N 5/23229* (2013.01)

(58) Field of Classification Search
  CPC ............... H04N 5/232; H04N 5/23212; H04N 5/23229; H04N 5/232127; H04N 5/36961; H04N 5/232122; H04N 5/23219; H04N 5/232123; H04N 5/3696
  See application file for complete search history.

(56) References Cited

U.S. PATENT DOCUMENTS

2005/0248681 A1* 11/2005 Nozaki .............. H04N 5/23212
                                            348/345
2009/0153666 A1*  6/2009 Takeuchi ............. G06K 9/4661
                                            348/169
2009/0256953 A1* 10/2009 Yasuda .................. G03B 13/32
                                            348/349
2012/0237193 A1*  9/2012 Kawarada ............. G03B 13/36
                                            396/95

FOREIGN PATENT DOCUMENTS

| JP | 2007-199261 | 8/2007 |
| JP | 2008-46354  | 2/2008 |
| JP | 2013-228571 | 11/2013 |
| JP | 2015-87706  | 5/2015 |

OTHER PUBLICATIONS

International Search Report from corresponding International Application No. PCT/JP 2017/036713, dated Jan. 16, 2018 (3 pgs.), with translation (2 pgs.).

* cited by examiner

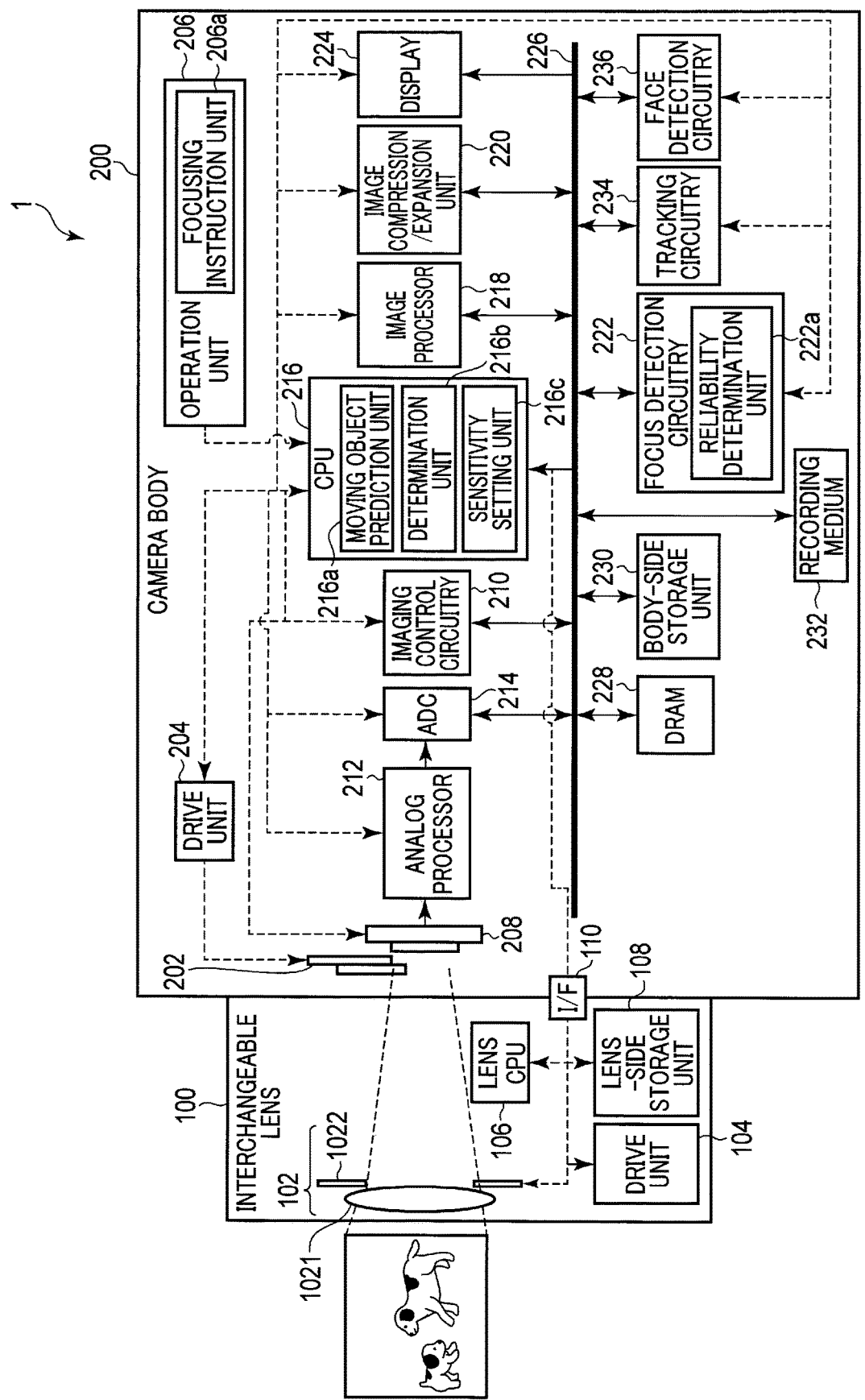
F I G. 1

FOCUSING APPARATUS, CONTROL METHOD OF FOCUSING APPARATUS, AND RECORDING MEDIUM STORING FOCUS ADJUSTMENT PROGRAM

CROSS-REFERENCE TO RELATED APPLICATIONS

This application is a Continuation Application of PCT Application No. PCT/JP2017/036713, filed Oct. 10, 2017 and based upon and claims the benefit of priority from the prior Japanese Patent Application No. 2016-230273, filed Nov. 28, 2016, the entire contents of all of which are incorporated herein by reference.

BACKGROUND OF THE INVENTION

1. Field of the Invention

The present invention relates generally to a focusing apparatus, a control method of focusing apparatus, and a recording medium storing a focus adjustment program.

2. Description of the Related Art

Jpn. Pat. Appln. KOKAI Publication No. 2007-199261 and Jpn. Pat. Appln. KOKAI Publication No. 2015-087706 propose a technology relating to an AF area selection based on a defocus amount during an autofocus (AF) operation. For example, Jpn. Pat. Appln. KOKAI Publication No. 2007-199261 discloses a technology for detecting an AF area in which a main subject exists based on a defocus amount, and Jpn. Pat. Appln. KOKAI Publication No. 2015-087706 discloses a technology in which an AF area with a large defocus amount deviation, being an AF area in which a main subject does not exist, would be difficult to be selected.

However, with these technologies, especially for a perspective mixed subject, it is not always possible to properly select an AF area. For example, when a subject on a close-range side is desired to be photographed, there is a possibility that AF may be performed with respect to the background on an infinity side. Under such circumstances, there is a demand for a technology that unfailingly performs AF on a main subject.

BRIEF SUMMARY OF THE INVENTION

According to an aspect of the invention, there is provided a focusing apparatus detecting a defocus amount repeatedly for each of a plurality of AF areas and selecting an AF area based on the defocus amount to perform focus adjustment, wherein the focusing apparatus includes processing circuitry that is configured to calculate a moving object prediction equation based on a history of a plurality of the repeatedly detected defocus amounts, perform a first determination as to whether or not the moving object prediction equation may be established, the moving object prediction equation being determined as being established when a divergence amount between the defocus amount equal to or larger than a predetermined number included in the history and the calculated moving object prediction equation is equal to or lower than a predetermined value, and a second determination as to whether a driving direction of a focus lens calculated from the moving object prediction equation is a close-range direction or an infinite direction, and in a case where the moving object prediction equation is determined as being established in the first determination, and the driving direction is determined as being the close-range direction in the second determination, select an AF area indicating a defocus amount closest to the moving object prediction equation among the latest defocus amounts detected for the plurality of AF areas.

According to an aspect of the invention, there is provided a method for controlling a focusing apparatus, the focusing apparatus detecting a defocus amount repeatedly for each of a plurality of AF areas and selecting an AF area based on the defocus amount to perform focus adjustment, the method including calculating a moving object prediction equation based on a history of a plurality of the repeatedly detected defocus amounts, performing a first determination as to whether or not the moving object prediction equation is established, the moving object prediction equation being determined as being established when a divergence amount between the defocus amount equal to or larger than a predetermined number included in the history and the calculated moving object prediction equation is equal to or lower than a predetermined value, and a second determination as to whether a driving direction of a focus lens calculated from the moving object prediction equation is a close-range direction or an infinite direction, and in a case where the moving object prediction equation is determined as being established in the first determination, and the driving direction is determined as the close-range direction in the second determination, selecting an AF area indicating a defocus amount closest to the moving object prediction equation among the latest defocus amounts detected for the plurality of AF areas.

According to an aspect of the invention, there is provided a computer-readable non-transitory storage medium storing a focus adjustment program for causing a computer to repeatedly detect a defocus amount for each of a plurality of AF areas, and to select the AF area used for focus adjustment based on the defocus amount, wherein the focus adjustment program includes calculating a moving object prediction equation based on a history of a plurality of the repeatedly detected defocus amounts, performing a first determination as to whether or not the moving object prediction equation is satisfied, the moving object prediction equation being determined as being established when a divergence amount between the defocus amount equal to or larger than a predetermined number included in the history and the calculated moving object prediction equation is equal to or lower than a predetermined value, and a second determination as to whether a driving direction of a focus lens calculated from the moving object prediction equation is a close-range direction or an infinite direction, and in a case where the moving object prediction equation is determined as being established in the first determination, and the driving direction is determined as the close-range direction in the second determination, selecting an AF area indicating a defocus amount closest to the moving object prediction equation among the latest defocus amounts detected for the plurality of AF areas.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of a configuration of a focusing apparatus 1 according to an embodiment.

DETAILED DESCRIPTION OF THE INVENTION

First Embodiment

<Configuration of Focusing Apparatus>

Figure 2A:
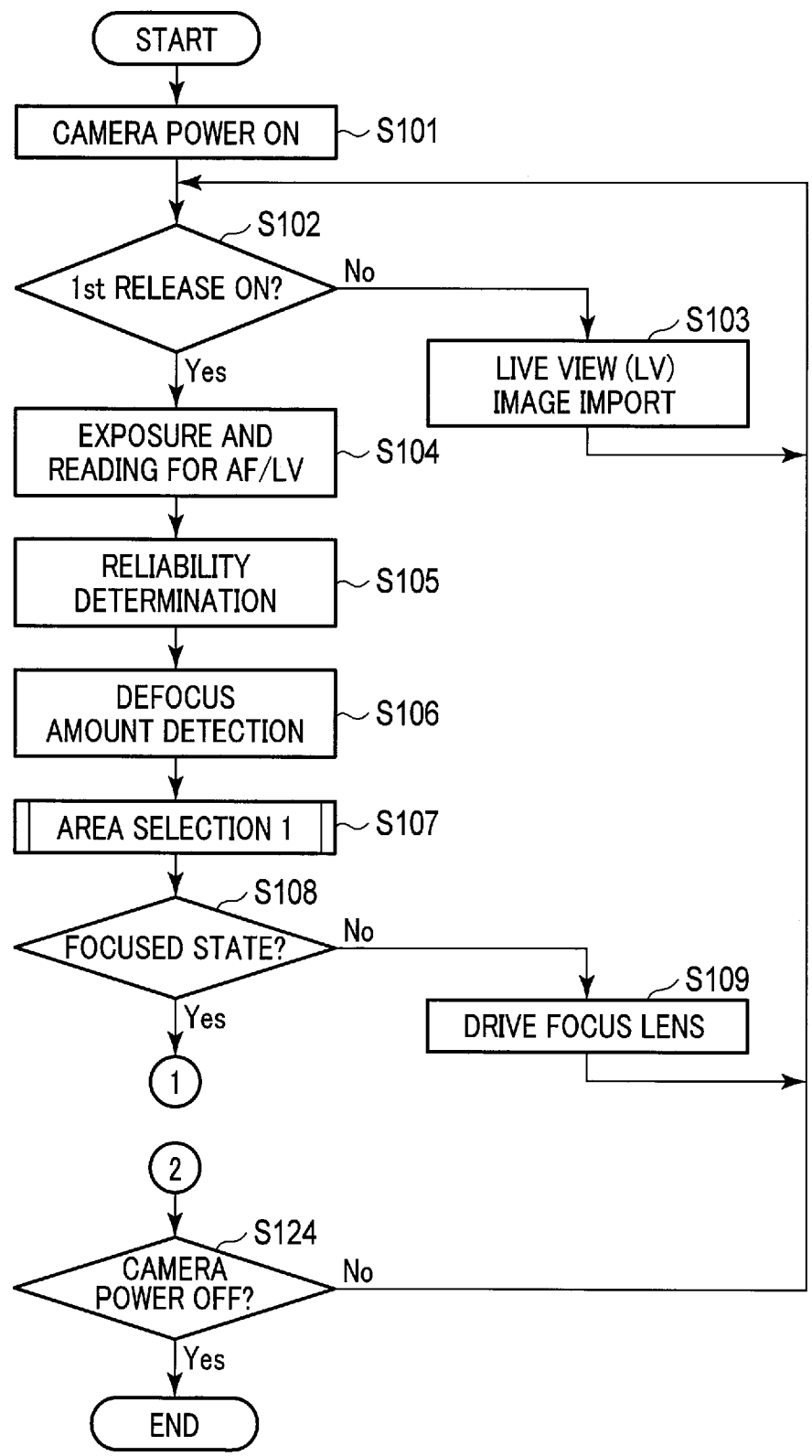
FIG. 2A is a flowchart showing an example of focusing apparatus control processing according to an embodiment.

Hereinafter, a first embodiment of the present invention will be explained with reference to the drawings. A configuration of a focusing apparatus 1 according to an embodiment of the present invention is shown as a block diagram in FIG. 1. The focusing apparatus 1 is an example of an imaging apparatus, and also an example of a camera system. In FIG. 1, an arrowed solid line indicates the flow of data, and an arrowed broken line indicates the flow of a control signal.

As shown in FIG. 1, the focusing apparatus 1 according to the present embodiment includes an interchangeable lens 100 and a camera body 200. The interchangeable lens 100 is configured to be attachable to and detachable from the camera body 200. The interchangeable lens 100 and the camera body 200 are connected so that they can communicate with each other when the interchangeable lens 100 is attached to the camera body 200. The focusing apparatus 1 does not necessarily have to be a camera system with interchangeable lenses. For example, the focusing apparatus 1 may be a lens integrated camera system.

The interchangeable lens 100 as a lens unit includes an imaging optical system 102, a drive unit 104, a lens CPU 106, and a lens-side storage unit 108.

The imaging optical system 102 is an optical system for forming an image of a subject light flux on an imaging element 208 of the camera body 200. The imaging optical system 102 includes a focus lens 1021 and an aperture 1022. The focus lens 1021 is configured to be able to adjust a focal position of the imaging optical system 102 by moving in an optical axis direction. The aperture 1022 is disposed on an optical axis of the focus lens 1021. The aperture diameter of the aperture 1022 is variable. The aperture 1022 adjusts the subject light flux passing through the focus lens 1021 and entering the imaging element 208. The drive unit 104 drives the focus lens 1021 and the aperture 1022 based on a control signal that is output from the lens CPU 106. Here, the imaging optical system 102 may be configured as a zoom lens. In this case, the drive unit 104 also performs a zoom drive.

The lens CPU 106 is configured communicably with a CPU 216 of the camera body 200 through an interface (I/F) 110 that serves as a lens communication unit. The lens CPU 106 functions as a focus control unit. The drive unit 104 performs focusing operation under the control of the CPU 216. Furthermore, the lens CPU 106 transmits information, such as an aperture value (F-number) of the aperture 1022 and lens information stored in the lens-side storage unit 108, to the CPU 216 through the I/F 110. The lens-side storage unit 108 stores lens information regarding the interchangeable lens 100. The lens information includes, for example, information on a focal distance of the imaging optical system 102 and aberration information.

The camera body 200 includes a mechanical shutter 202, a drive unit 204, an operation unit 206, the imaging element 208, imaging control circuitry 210, an analog processor 212, analog-to-digital processing circuitry (ADC) 214, the CPU 216, an image processor 218, an image compression/expansion unit 220, focus detection circuitry 222, a display 224, a bus 226, a DRAM 228, a body-side storage unit 230, a recording medium 232, tracking circuitry 234, and face detection circuitry 236.

The mechanical shutter 202 is configured to be openable/closable, and adjusts an incidence time of a light flux from a subject to the imaging element 208 (an exposure time of the imaging element 208). As the mechanical shutter 202, for example, a focal-plane shutter is employed. The drive unit 204 drives the mechanical shutter 202 based on a control signal from the CPU 216.

The operation unit 206 includes a focusing instruction unit 206a. The focusing instruction unit 206a includes, for example, a release button, and outputs a control signal for starting focusing in response to an operation, such as a first release, by a user. That is, the focusing instruction unit 206a instructs start of a focus adjustment. The operation unit 206 includes various types of operation buttons, such as a power button, a movie button, a playback button, and a menu button, and various types of operation members, such as a touch panel. The operation unit 206 senses an operation state of various types of operation members, and outputs a signal indicating a sense result to the CPU 216.

The imaging element 208 is arranged on an optical axis of the imaging optical system 102, behind the mechanical shutter 202, and at a position where the imaging optical system 102 forms an image of the subject light flux. The imaging element 208 is configured by two-dimensionally arranging light-receiving portions (for example, photodiodes) that configure pixels. The light-receiving portions configuring the imaging element 208 generate electric charges corresponding to the amount of received light. The electric charge generated in the light-receiving portion is accumulated in a capacitor connected to each light-receiving portion. The electric charge accumulated in this capacitor is read out as a pixel signal in accordance with a control signal from the imaging control circuitry 210. Here, the imaging element 208 may have focus detection pixels.

The imaging control circuitry 210 controls the exposure of the imaging element 208 and the reading of the pixel signals from the imaging element 208 in accordance with a readout setting of a pixel signal from the imaging element 208.

The analog processor 212 performs analog processing, such as amplification processing, on the pixel signal read from the imaging element 208 under the control of the imaging control circuitry 210. An ADC 214 converts the pixel signal output from the analog processor 212 into digital format pixel data. In the following explanation, a collection of pixel data will be referred to as image data.

The CPU 216 is a control unit that performs overall control of the focusing apparatus 1 according to a program stored in the body-side storage unit 230. The CPU 216 includes a moving object prediction unit 216a, a determination unit 216b, and a sensitivity setting unit 216c.

The moving object prediction unit 216a calculates a moving object prediction equation based on a history of a plurality of repeatedly detected defocus amounts. The history includes, for example, a history of past distance measurement results (defocus amount or drive position of the focus lens 1021) stored in the DRAM 228. The plurality of defocus amounts are repeatedly detected by, for example, the focus detection circuity 222 to be described later.

The determination unit 216b determines (first determination) whether or not the moving object prediction equation may be established. The determination unit 216b also determines (second determination) whether a driving direction of the focus lens obtained by the moving object prediction equation is a close-range direction or an infinite direction. The second determination can also be expressed as a determination on whether the inclination of the moving object prediction equation is positive (the driving direction is a close-range direction) or negative (the driving direction is an infinite direction) when a vertical axis expresses a lens position, and a horizontal axis expresses time. In the explanation in the present embodiment, when the defocus amount is positive, it means that there is a certain focus deviation amount, and a focus deviation direction is on the close-range direction side. However, it is needless to say that whether the defocus amount, or the inclination of the moving object prediction equation, etc. is positive or negative can be changed depending on, for example, which of the lens driving directions is a positive direction. As will be described in detail later, the determination unit 216b further performs a determination (third determination) as to whether or not a defocus amount that is a minimum value of an absolute value of a positive defocus amount, and is a defocus amount smaller than a predetermined factor of times of a minimum value of an absolute value of a negative defocus amount exists among the detected plurality of defocus amounts, or as to whether or not the positive defocus amount is sufficiently small.

As will be described later, the determination unit 216b may also perform evaluation on the accuracy of the moving object prediction equation, such as to what extent the calculated moving object prediction equation complies with the history information of the defocus amount. Furthermore, the accuracy of the moving object prediction equation evaluated in such manner can also be expressed as, for example, reliability of the moving object prediction equation, or the precision of the moving object prediction equation, etc.

The sensitivity setting unit 216c sets sensitivity of focus adjustment. For example, high sensitivity is set when a user intends to have the AF follow an intensely moving subject that suddenly accelerates or suddenly decelerates. A plurality of predetermined values that are selectable from, for example, "high", "standard", or "low", may be prepared for the sensitivity, or a user may set an appropriate value for the sensitivity.

The image processor 218 performs various types of image processing on pixel data. For example, when recording a still image, the image processor 218 performs image processing for still image recording. Similarly, when recording a movie image, the image processor 218 performs image processing for movie image recording. Furthermore, when displaying a live view, the image processor 218 performs image processing for display.

When recording the image data, the image compression/expansion unit 220 compresses the image data (still image data or movie image data) generated by the image processor 218. Furthermore, when reproducing the image data, the image compression/expansion unit 220 expands the image data that is recorded in a compressed state in the recording medium 232.

The focus detection circuitry 222 performs a defocus amount calculation for calculating the defocus amount (the focus deviation direction and the focus deviation amount) with respect to the focusing position of the focus lens 1021. In the case where the focus detection pixels are provided in the imaging element 208, the focus detection circuitry 222 acquires the pixel data from the focus detection pixels and, based on the acquired pixel data, calculates the defocus amount with respect to the focusing position of the focus lens 1021 using a phase difference system. The focus detection circuitry 222 then calculates the lens position at which the focus lens 1021 should be driven based on the defocus amount. In the following explanation, the focus detection circuitry 222 is assumed as detecting the defocus amount by the phase difference system using the focus detection pixels. However, the focus detection circuitry 222 may detect the defocus amount using various types of systems other than the phase difference system using the focus detection pixels. For example, the focus detection circuitry 222 may detect the defocus amount from a pair of pieces of image data output from a distance measuring sensor that is different from the focus detection pixel. The focus detection circuitry 222 includes a reliability determination unit 222a. The reliability determination unit 222a performs reliability determination on the detection of the defocus amount, that is, reliability of an interval value of two images (two-image internal value).

The display 224 is, for example, a display unit such as a liquid crystal display or an organic EL display, and is disposed on, for example, the back of the camera body 200. The display 224 displays an image in accordance with the control of the CPU 216. The display 224 is used upon live-view display or display of a recorded image, etc.

The bus 226 is connected to the ADC 214, the CPU 216, the image processor 218, the image compression/expansion unit 220, the focus detection circuitry 222, the DRAM 228, the body-side storage unit 230, and the recording medium 232, and functions as a transfer path for transferring various kinds of data present in these blocks.

The DRAM 228 is a memory that is electrically rewritable, and temporarily stores various types of data, such as the above-mentioned image data (pixel data), image data for recording, image data for display, and processing data in the CPU 216. An SDRAM may also be used for temporarily storing data. The body-side storage unit 230 stores various types of data, such as programs used in the CPU 216, and adjustment values of the camera body 200. The recording medium 232 is configured to be built or installed in the camera body 200, and records the image data for recording as an image file in a predetermined format. The DRAM 228, the body-side storage unit 230, and the recording medium 232 may be configured respectively by one memory, or by a combination of a plurality of memories, etc.

The tracking circuitry 234 tracks moving subjects, such as moving children and pets. The face detection circuitry 236 detects whether or not the subject includes a face. In the case where a face is included, the tracking circuitry 234 detects the face position within the angle of view. Hereinafter, in the present embodiment, a region including a face detected by the face detection circuitry 236 is described as a face detection range. Furthermore, the face detection circuitry 236 includes pupil detection circuitry. The pupil detection circuitry detects, for example, the presence or absence of a pupil and the position of a pupil, etc. within the face detection range detected by the face detection circuitry 236.

The lens CPU 106, the CPU 216, and each unit of the CPU 216 include integrated circuits, etc., such as a central processing unit (CPU), an application specific integrated circuit (ASIC), a field programmable gate array (FPGA), a digital signal processor (DSP), or a graphics processing unit (GPU). The CPU 216 and each unit of the CPU 216 may be configured respectively by one integrated circuit, etc., or may be configured by a combination of a plurality of integrated circuits, etc. The operations of these integrated circuits, etc. are performed in accordance with a program recorded in, for example, a recording area inside the lens-side storage unit 108, the body-side storage unit 230, or the integrated circuit, etc.

<Operation of Focusing Apparatus>

Figure 2B:
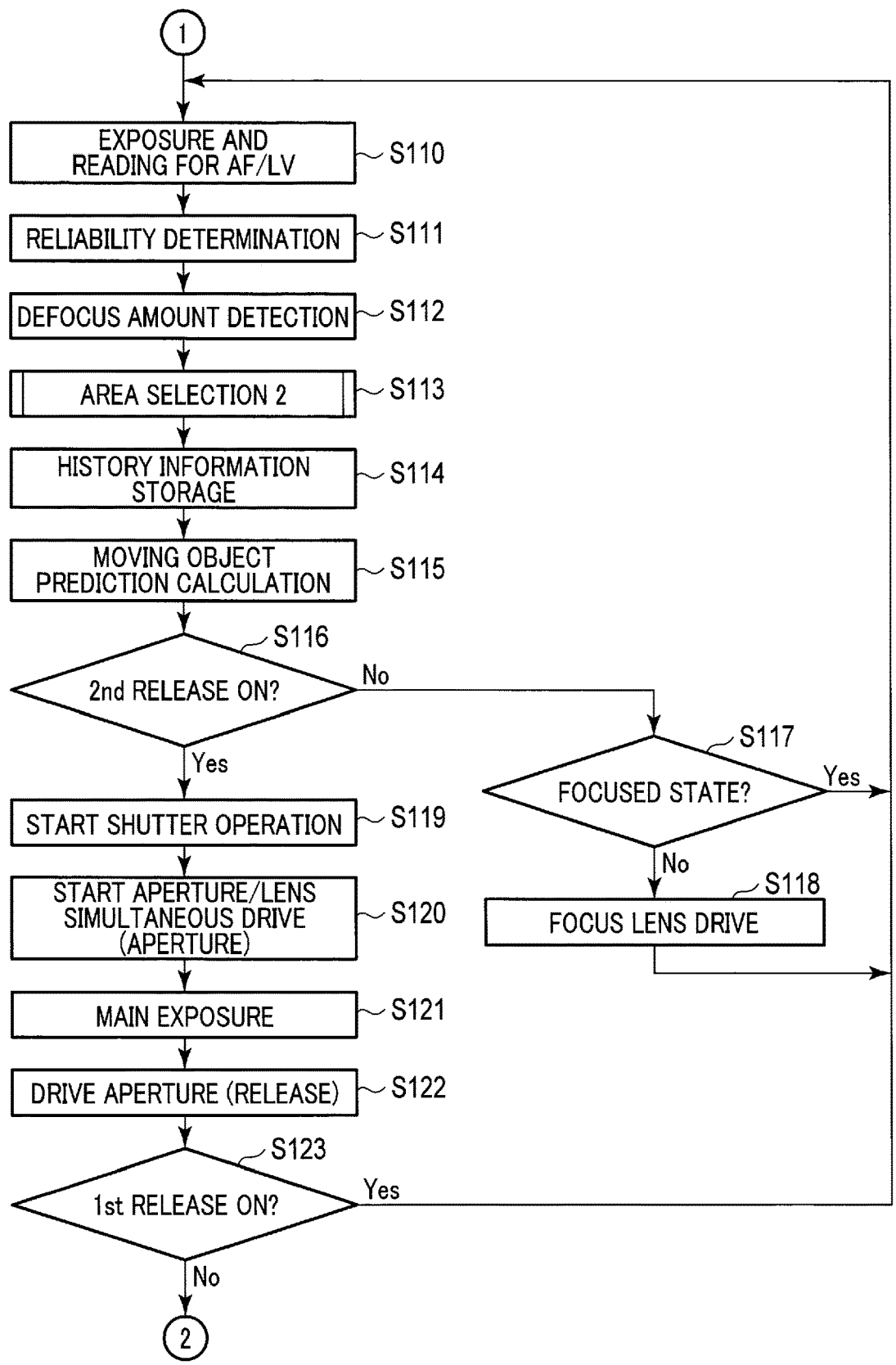
FIG. 2B is a flowchart showing an example of focusing apparatus control processing according to an embodiment.

An example of the focusing apparatus control processing according to the present embodiment is shown in FIG. 2A and FIG. 2B as flowcharts. The operation of the focusing apparatus 1 will be explained with reference to these drawings.

In step S101, the CPU 216 turns on the power of the camera based on, for example, an operation signal output by the operation unit 206 in accordance with a user's operation.

In step S102, the CPU 216 determines whether or not a first release switch is in an ON-state based on, for example, an operation signal output by the focusing instruction unit 206a in accordance with the user's operation. The first release switch is, for example, a switch that is turned on in response to a half press operation of the release button by the user. In the case where the first release switch is determined as being in an ON-state, the focusing apparatus control processing proceeds to step S104, and, in the case where it is not, the focusing apparatus control processing proceeds to step S103.

In step S103, the CPU 216 imports image data for a live view (LV) display. The CPU 216 first causes a control signal of the drive unit 204 to be switched so that the mechanical shutter 202 reaches a fully-open state, and outputs a control signal to the lens CPU 106 so as to drive the aperture 1022. The CPU 216 starts an exposure operation for the LV display by the imaging element 208 after a lapse of a predetermined time for allowing the aperture 1022 to be opened and the mechanical shutter 202 to be fully-opened. The frame rate of the exposure operation for the LV display is, for example, 60 fps. Furthermore, the image processor 218 performs correction processing on the pixel data from the focus detection pixel. By this correction processing, the pixel data from the focus detection pixel can be used for the LV display in the same manner as the pixel data from the imaging pixel. After this correction processing, the image processor 218 performs other processing necessary for generating image data for the LV display to generate image data for display. Based on the image data for display generated by the image processor 218, the CPU 216 causes the display 224 to display the LV image. Subsequently, the focusing apparatus control processing returns to step S102. In the manner described above, the processing relating to the LV display in step S103 is repeated until it is determined in step S102 that the first release switch is in an ON-state.

In step S104, the CPU 216 imports image data for autofocus (AF). At this time, the CPU 216 starts an exposure operation for the AF by the imaging element 208. The exposure time in the exposure operation for the AF may be made different from the exposure time in the exposure operation for the LV display. Furthermore, in the exposure operation for the AF, the pixel signal may be read from only the focus detection pixel.

Figure 3:
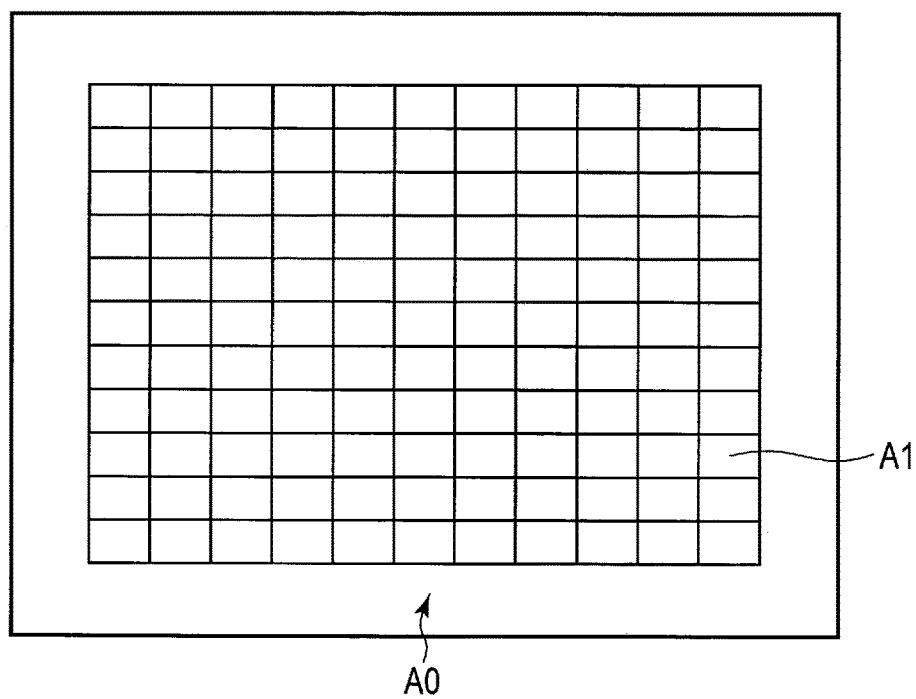
FIG. 3 is a schematic diagram showing an example of a plurality of AF areas according to an embodiment.

In step S105, the reliability determination unit 222a performs reliability determination of a two-image interval value. Here, an example of a plurality of AF areas according to the present embodiment is schematically shown in FIG. 3, with reference to which the reliability determination of the two-image interval value according to the present embodiment will be explained. In the present embodiment, as shown in FIG. 3, an example of a case in which eleven AF areas A1 are arranged vertically and horizontally, and an entire AF area A0 is configured by 121 AF areas is explained. The reliability determination according to the present embodiment is performed, for example, in each AF area included in the entire AF area A0. Depending on how the focus detection pixels are arranged, the two-image interval value can be obtained in each of the two phase difference detection directions of the vertical direction and the horizontal direction with respect to one AF area. In this case, the reliability determination according to the present embodiment is performed for the vertical direction and the horizontal direction in each of the 121 AF areas. In the reliability determination according to the present embodiment, it is determined whether or not the contrast amount of a focus detection pixel output is sufficient, whether or not a minimal value in a correlation calculation result is sufficiently small, and whether or not an inclination FS is sufficient between the minimal value in the correlation calculation result and a larger value of the correlation calculation results among the correlation calculation results at both adjacent sides of a position taking the minimal value (whether or not the edges assume a V-shape). The processing after step S105 in the focusing apparatus control processing according to the present embodiment is executed only for the AF area that is determined as satisfying all of the above three determination conditions as a result of performing the reliability determination. The description herein does not exclude performing the processing thereafter for the AF area that does not satisfy all of the above three conditions. In addition, a threshold value of the reliability determination may also be set separately for performing area selection and for performing focus determination. When performing area selection, a strict threshold value is set to perform area selection stably, and when performing focus determination, etc., a threshold value that is at a borderline level of securing accuracy is set.

However, the determination condition in the reliability determination is not limited to the above three conditions; therefore, other conditions may be added, or one of the three conditions may be omitted. Furthermore, the determination on whether or not each AF area satisfies the conditions may also be in a form where the extent of how much the conditions are satisfied is calculated as a numerical value, and the reliability is evaluated based on such numerical value.

With reference to FIG. 2A and FIG. 2B, the explanation on the operation of the focusing apparatus 1 will be continued. In step S106, the focus detection circuitry 222 calculates the defocus amount (the focus deviation direction and the focus deviation amount) with respect to the focusing position of the focus lens 1021 by a phase difference system using the pixel data acquired from the focus detection pixel. In the present step, the two-image interval value (an image deviation amount indicating a minimum correlation calculation result) of each AF area is multiplied by a sensitivity value that differs for each AF area, and the defocus amount is calculated as, for example, a value in millimeters. Furthermore, a best contrast deviation correction amount of the imaging optical system (generally, a frequency deviation amount of an imaging optical system), which is a correction amount that differs for each AF area, is added to the defocus amount. The correction amount can also be expressed as an optical correction amount. The optical correction amount is stored in, for example, the body-side storage unit 230. Furthermore, in the present step, in order to perform moving object prediction, the focus detection circuitry 222 also performs processing for converting the defocus amount into a focus lens position (lens pulse position). In this conversion, the focus detection circuitry 222 according to the present embodiment converts the defocus amount into a pulse position by using an approximation equation for each defocus amount with respect to the current lens position. The approximation equation is, for example, a cubic equation determined for each interchangeable lens. Here, a focusing pulse position, which is a focusing lens position, is calculated by an equation expressed as focusing pulse position=current lens position (lens pulse position)+a×cube of defocus amount+b×square of defocus amount+c×defocus amount. The coefficients of a, b, and c in the equation are values uniquely determined for each imaging optical system depending on a zoom value of the imaging optical system and the current lens position.

In the case where a calculation time relating to the addition of the correction amount is desired to be reduced, the focus detection circuitry 222 performs processing, for example, in the following manner. For example, in the case where an AF area setting is a group-target using 5 points or 9 points, etc. out of 121 points, only the correction amount in one AF area included in the group is calculated, and the same correction amount is applied as a temporary correction amount to all of the AF areas included in the group.

Figure 4:
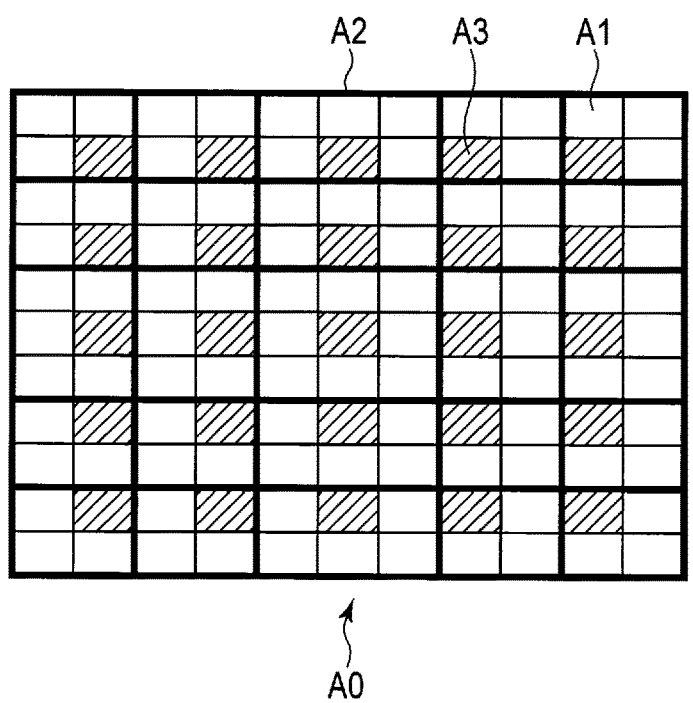
FIG. 4 is a schematic diagram showing an example of a unit in which a correction amount is calculated in the case of an all-target according to an embodiment.

Furthermore, for example, in the case where the AF area setting is an all-target using all 121 AF areas, as in the case of the group-target described above, the same correction amount is applied as a temporary correction amount to each collective region. An example of a calculation unit of the correction amount in the case of the all-target is shown as a schematic diagram in FIG. 4. For example, the correction amount is calculated for each correction amount calculation execution range A2 including a plurality of AF areas A1, and as shown by a thick frame line in FIG. 4. The correction amount calculation execution range A2 includes, for example, a plurality of AF areas, such as 9 points (3×3) at the center, 6 points (3×2) above and below the center, 6 points (2×3) on the left and right of the center, and 4 points (2×2) in other ranges. Here, for example, as the correction amount of the AF areas included in the correction amount calculation execution range A2, the correction amount in an AF area A3 included in the correction amount calculation execution range A2 is adopted as a temporary correction amount. For example, the AF area A1 indicated by hatching in FIG. 4 is selected as the AF area A3. For example, as shown in FIG. 4, the AF area A3 is disposed at positions closest to the center of the imaging element 208 among the AF areas A1 included in each of the correction amount calculation execution ranges A2; however, the AF area A3 is not limited thereto. Any AF area A1 among the AF areas A1 included in each of the correction amount calculation execution ranges A2 may be selected as the AF area A3.

Therefore, the calculation of the correction amount can be achieved by the calculation time required for 25×2 directions, and not for 121 times×2 directions. When calculating a final defocus amount to drive the lens, the focus detection circuitry 222 may finally calculate the correct correction amount with respect to the AF area selected by the area selection processing described later.

In step S107, the CPU 216 performs first area selection processing. Details of the first area selection processing will be described later; however, in the present processing, an AF area indicating the closest defocus amount is selected based on the value of the defocus amount calculated in step S106. Furthermore, the first area selection processing is performed after the first release is pressed until the focus determination is once performed.

In step S108, the CPU 216 determines whether or not the focus lens 1021 is in a focused state. Such determination is performed, for example, by determining whether or not the defocus amount is within a preset permissible range. Details of this determination will be described later. In the case where the focus lens 1021 is not determined as being in the focused state, the focusing apparatus control processing proceeds to step S109. In the case where the focus lens 1021 is determined as being in the focused state, the focusing apparatus control processing proceeds to step S110.

In step S109, the CPU 216 outputs a control signal to the lens CPU 106 so that the focus lens 1021 is driven in accordance with the focus lens position (lens pulse position). The lens pulse position is, for example, the focusing pulse position calculated by the focus detection circuitry 222 based on the defocus amount in step S106. The lens CPU 106 acquires the control signal and drives the focus lens

1021 through the drive unit 104. Subsequently, the focusing apparatus control processing returns to step S102.

In step S110, the CPU 216 starts exposure operations for AF and LV in the same manner as the processing in step S104, and reads a pixel signal. In step S111, the reliability determination unit 222a performs reliability determination of a two-image interval value in the same manner as the processing in step S105.

In step S112, the focus detection circuitry 222 calculates a defocus amount in the same manner as the processing in step S106. Furthermore, the focus detection circuitry 222 further performs processing of converting the defocus amount into a focus lens position (focusing pulse position).

In step S113, the CPU 216 performs second area selection processing. Details of the second area selection processing will be described later; however, this processing is executed after the main subject is once focused (that is, while the first release is held).

In step S114, the CPU 216 performs processing to store history information to be used for the moving object prediction calculation in, for example, the DRAM 228. The history information includes the lens pulse position based on the defocus amount corresponding to, for example, the AF area selected in the second area selection processing.

In step S115, the moving object prediction unit 216a starts the moving object prediction calculation. The moving object prediction calculation is processing for predicting the current driving position of the focus lens 1021 from the history of the past distance measurement result (the drive position of the focus lens 1021).

In step S116, the CPU 216 determines whether or not a second release switch is turned on. The second release switch is a switch that is turned on in response to, for example, a full press operation of the release button by the user. The focusing apparatus control processing proceeds to step S117 in the case where it is determined that the second release switch is not turned on, and proceeds to step S118 when it is determined that the second release switch is turned on.

In step S117, the CPU 216 determines whether or not the focus lens 1021 is in a focused state in the same manner as step S108. Details of this determination will be described later. The focusing apparatus control processing proceeds to step S118 in the case where it is not determined that the focus lens 1021 is in a focused state, and returns to step S110 in the case where it is determined that the focus lens 1021 is in a focused state.

In step S118, the CPU 216 drives the focus lens in the same manner as step S109. Subsequently, the focusing apparatus control processing returns to step S110.

In step S119, the CPU 216 starts the operation of the mechanical shutter 202 in order to perform main exposure of a still image continuous shooting. The operation of the mechanical shutter 202 includes an open/close operation of the mechanical shutter 202 before and after the main exposure, and a fully-open operation of the mechanical shutter 202 for starting the exposure operation for the live view and the AF after the main exposure. The CPU 216 first switches the control signal of the drive unit 204 so that the mechanical shutter 202 reaches a fully-closed state. After the main exposure is performed in step S121, the CPU 216 controls the drive unit 204 so that the mechanical shutter 202 reaches a fully-open state.

In step S120, the CPU 216 instructs the lens CPU 106 to simultaneously drive the focus lens 1021 and the aperture 1022, and starts the operation. Here, in the present step, an instruction is given to drive the aperture 1022 to be narrowed down to an aperture amount necessary for the still image continuous shooting determined in advance by an exposure amount calculation for Automatic Exposure (AE), etc.

In step S121, the CPU 216 starts the main exposure. The main exposure is an exposure operation for acquiring image data for recording. In the main exposure, the CPU 216 controls the drive unit 204 so that the mechanical shutter 202 is opened/closed for only a predetermined exposure period necessary for the still image continuous shooting. The CPU 216 then starts an imaging operation of the imaging element 208 during the exposure period. After the exposure period is ended, the imaging control circuitry 210 reads a pixel signal from each pixel of the imaging element 208. After the pixel signal is read, the image processor 218 corrects the pixel output of the focus detection pixel, and performs processing for generating other image data for recording. After the image processing is completed, the image compression/expansion unit 220 compresses the image data for recording. After the compression is completed, the CPU 216 records the compressed image data for recording in the recording medium 232 as an image file.

In step S122, the CPU 216 instructs the lens CPU 106 to drive the aperture 1022. Here, in the present step, an instruction is given to drive the aperture 1022 to be opened to an opening amount (for example, an open aperture) necessary for live view exposure and for AF exposure. The processing in the present step may be performed in parallel with the reading of the pixel signal after the main exposure in step S121. By such parallel processing, the display time of the live view image during the main exposure can be extended.

In step S123, similarly to step S104, the CPU 216 determines whether or not the first release switch is in an ON-state. The focusing apparatus control processing returns to step S110 when determined as being in the first release state, and proceeds to step S124 when not determined as being in the first release state.

In step S124, the CPU 216 determines whether or not to turn off the power of the camera body 200. For example, in the case where the power is instructed to be turned off by a user's operation of the operation unit 206, or in the case where the user's operation of the operation unit 206 is absent for a predetermined period of time, the power is determined to be turned off. The focusing apparatus control processing returns to step S102 in the case where the power of the camera body 200 is determined not to be turned off, and ends in the case where the power of the camera body 200 is determined to be turned off.

<First Area Selection Processing>

Here, the first area selection processing in step S107 will be explained in more detail. As in the case where it is determined in step S102 that the first release switch has been pressed, the first area selection processing is performed after the focusing instruction unit 206a instructs start of the focus adjustment until the determination on the focused state is once performed (focus determination) in step S108. In the first area selection processing, an AF area indicating a maximum value of the positive defocus amount (an AF area indicating a closest defocus amount) is selected among the plurality of defocus amounts.

(Case of Single-Target)

In the case of a single-target, for example, as a result of a phase difference detection in a vertical direction and a horizontal direction within one AF area that is designated by a user and a reliability determination of a two-image interval value, a phase difference detection direction indicating a maximum value of the defocus amount is selected from the phase difference detection directions that are determined as having reliability, and the defocus amount indicated by the phase difference detection direction is adopted. The AF area for which the phase difference detection calculation is performed may be referred to as an AF calculation execution range.

(Case of Group-Target)

Figure 5:
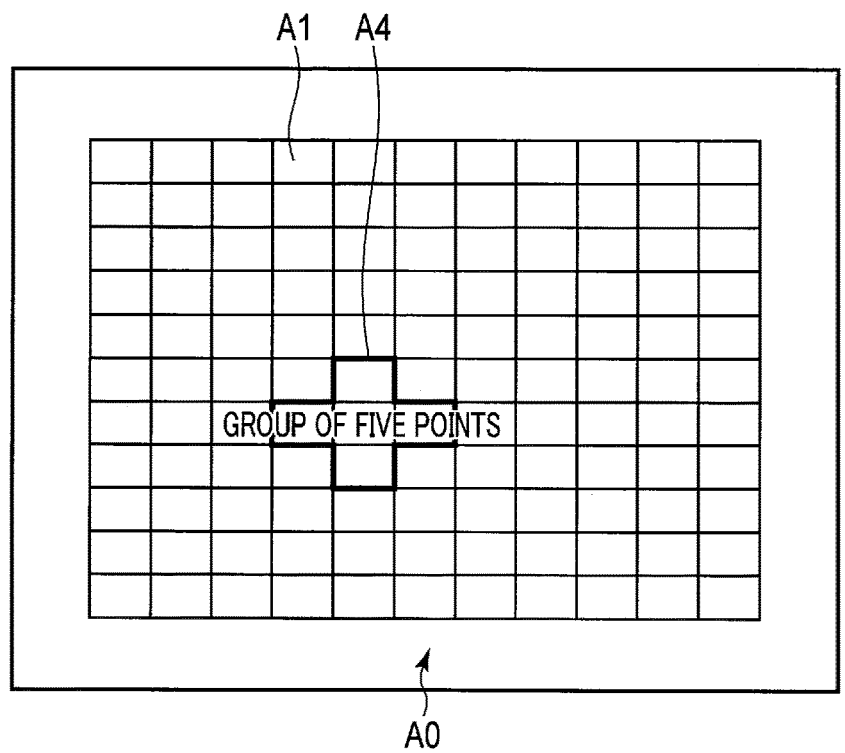
FIG. 5 is a schematic diagram showing an example of an AF calculation execution range in the case of a group-target in first area selection processing according to an embodiment.
Figure 6:
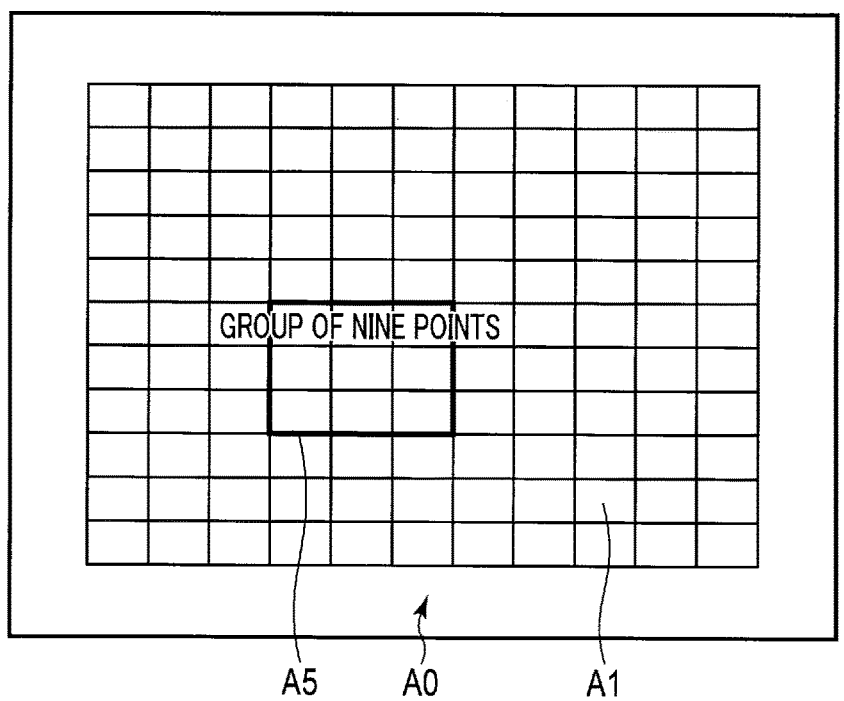
FIG. 6 is a schematic diagram showing an example of an AF calculation execution range in the case of a group-target in first area selection processing according to an embodiment.

In the case of a group-target, a defocus amount is calculated in, for example, a region including a plurality of AF areas such as a group of 5 points or a group of 9 points designated by a user. FIG. 5 and FIG. 6 each show an example of an AF calculation execution range in the case of a group-target in the first area selection processing according to the present embodiment. An AF calculation execution range A4 of the group of 5 points and an AF calculation execution range A5 of the group of 9 points are regions surrounded respectively by a cross-shaped or a rectangular-shaped thick frame line shown respectively in FIG. 5 or FIG. 6. In the case of these group-targets, among the AF areas belonging to groups and among the AF areas determined to have reliability, an AF area indicating a maximum value of the defocus amount is selected, and the defocus amount indicated by such AF area is adopted.

The area selection may also be such that, after the AF area indicating the maximum value of the defocus amount is selected, in the same manner as in the case of the single-target, the phase difference detection direction indicating the maximum value of the defocus amount is further selected, and the defocus amount indicated by the phase difference detection direction is adopted. The area selection may also be such that the phase difference detection direction indicating the maximum value of the defocus amount is selected among the phase difference detection directions included in the AF area belonging to the group and determined to have reliability, and the defocus amount indicated by the phase difference detection direction is adopted.

(Case of all-Target)

Figure 7:
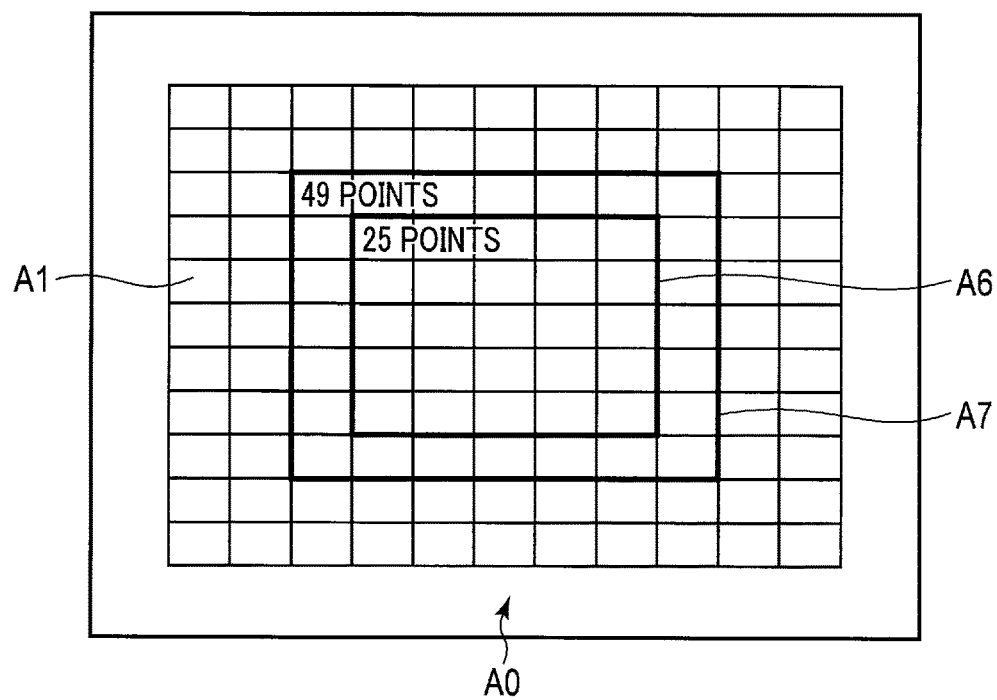
FIG. 7 is a schematic diagram showing an example of an AF calculation execution range in the case of an all-target in first area selection processing according to an embodiment.

In the case of an all-target, an AF area indicating a center-prioritized positive defocus amount is selected. An example of an AF area (priority calculation range) preferentially selected in the case of all-target in the first area selection processing according to the present embodiment is shown in FIG. 7. The center 25 AF areas (first priority calculation range A6) surrounded by a thick frame line in FIG. 7 are selected with the highest priority. Subsequently, the center 49 AF areas (second priority calculation range A7) surrounded by a thick frame line in FIG. 7 are selected. In the case of the all-target, the AF calculation execution range is the total 121 AF areas A0, and the first priority calculation range A6 and the second priority calculation range A7 are included in the AF calculation execution range.

First, the center 25 AF areas (first priority calculation range A6) of the total 121 AF areas A0 (AF calculation execution range) as shown in FIG. 7 are considered. In the case where there is an AF area determined to have reliability in the first priority calculation range A6, the defocus amount of the AF area indicating a positive defocus amount is adopted therefrom.

On the other hand, in the case where there is no AF area determined to have reliability in the first priority calculation range A6, the center 49 AF areas (second priority calculation range A7) as shown in FIG. 7 are considered. In the case where there is an AF area determined to have reliability in the second priority calculation range A7, the defocus amount of the AF area indicating the closest defocus amount is adopted therefrom.

Furthermore, there may be a case in which neither the first priority calculation range A6 nor the second priority calculation range A7 include an AF area that is determined to have reliability. In such a case, the defocus amount of the AF area indicating the closest defocus amount is adopted among the AF areas determined to have reliability within the total 121 AF areas A0 (AF calculation execution range).

In the same manner as in the case of the group-target, the area selection in the case of the all-target may also be performed regarding the defocus amount indicated by the phase difference detection direction.

(Case of Tracking AF)

In the case of tracking AF, first, the AF area is selected and the defocus amount is acquired based on the AF area setting of the single-target, the group-target, or the all-target described above. However, in the case of the tracking AF, the AF area is updated as needed based on the movement (tracking result) of the subject.

(Case of Face AF)

Figure 8:
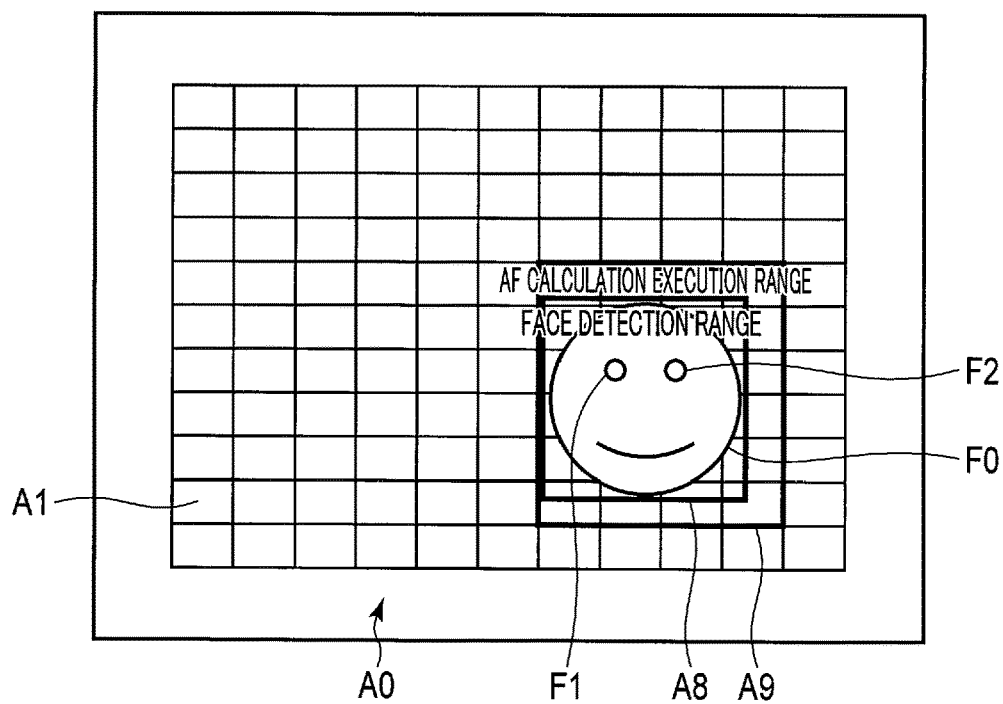
FIG. 8 is a schematic diagram showing an example of a face detection range and an AF calculation execution range in the case of face AF in first area selection processing according to an embodiment.

FIG. 8 shows an example of a face detection range and an AF calculation execution range in the case of face AF in the first area selection processing according to the present embodiment. In the case of the face AF, an AF calculation execution range A9 is determined based on a face detection range A8 in which a face F0 exists. An AF area closest to the position of a pupil (pupil position F1 or pupil position F2) is then preferentially selected among the AF areas determined to have reliability within the AF calculation execution range A9. In the case where the AF area in the vicinity of the pupil position is not reliable, the AF area at the center of the face is preferentially selected.

Figures 9, 10:
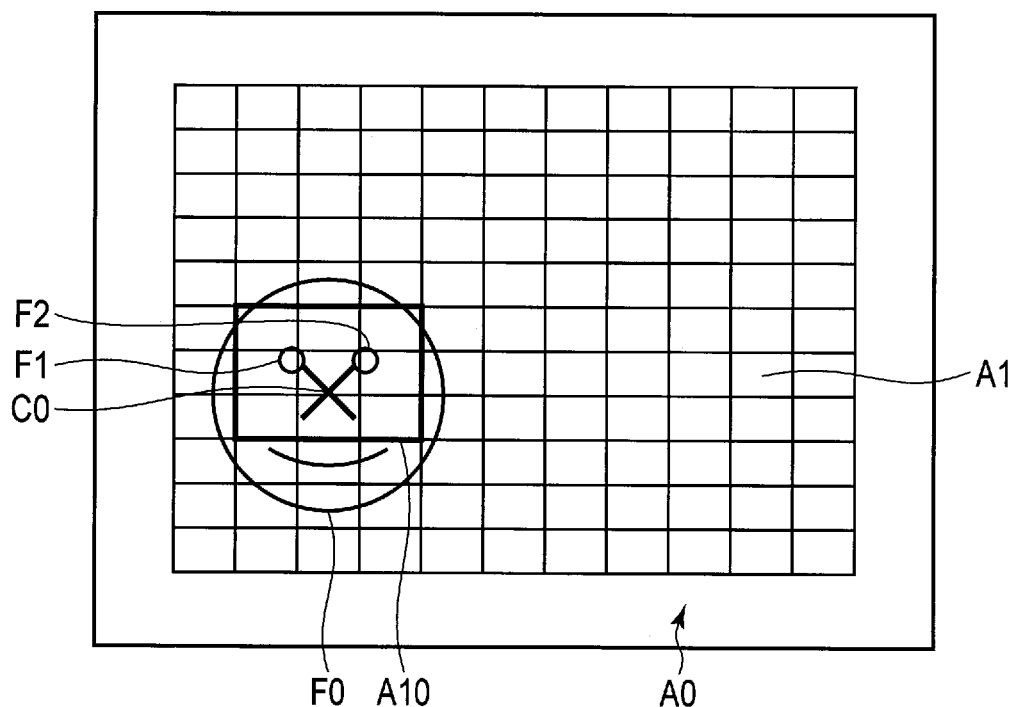
FIG. 9 is a schematic diagram showing an example of a priority order of selection of AF areas included in an AF calculation execution range in the case of face AF in first area selection processing according to an embodiment.
FIG. 10 is a schematic diagram showing an example of an AF calculation execution range at a time of tracking AF in second area selection processing according to an embodiment.

Here, FIG. 9 shows the order of priority in which the AF area included in the AF calculation execution range A9 is selected in the case shown in FIG. 8. Numerals shown in FIG. 9 represent the priority order in which each AF area included in the AF calculation execution range A9 is selected, indicating the smaller the number, the higher the priority order.

In the case of the face AF according to the present embodiment, since the AF area closest to the pupil position (the pupil position F1 or the pupil position F2) is preferentially selected, the AF area of position 1 or 2 in FIG. 9 is selected. Here, in the case where both AF areas of positions 1 and 2 are determined to have reliability, a more reliable AF area is selected between these AF areas.

On the other hand, in the case where neither AF areas of portions 1 nor 2 are determined to have reliability, the AF area with the highest priority ranking in FIG. 9 is preferentially selected among the reliable AF areas. As described above, in the face AF in the first area selection processing, among the plurality of defocus amounts repeatedly detected by the focus detection circuitry 222 in each AF area, the AF area corresponding to the position of the pupil within the face detection range or the AF area determined to have high reliability is selected.

In the present embodiment, a case in which the face detection range A8 is a 4×4 AF area has been explained; however, the present invention is not limited thereto. The face detection range A8 may include a 3×3 or a 5×5 AF area depending on the size of the face F0. Furthermore, the AF calculation execution range A9 may change according to the size of the face detection range A8.

In the above explanation, the CPU 216 executes the first area selection processing after the focusing instruction unit 206*a* instructs to start the focus adjustment until the focus determination is once made; however, the present invention is not limited thereto. For example, the CPU 216 may perform the same processing as the first area selection processing when performing the exposure operation for the LV display that is repeatedly performed until it is determined that the first release switch is in an ON-state. That is, until the focusing instruction unit 206a instructs to start focus adjustment, processing may be performed in which the focus detection circuitry 222 selects an AF area that indicates the closest defocus amount among a plurality of defocus amounts repeatedly detected in each AF area. Furthermore, also in the face AF, for example, until the focusing instruction unit 206a instructs to start focus adjustment, processing may be performed in which the AF area corresponding to the position of the pupil within the face detection range or the AF area determined to have high reliability is selected from among the plurality of defocus amounts.

<Second Area Selection Processing>

Here, the second area selection processing in step S113 will be explained. In the second area selection processing, the AF area is selected in the following manner after the main subject is once focused (that is, while the first release is held).

It is necessary to keep the main subject captured while the first release is held. When in the above state where the main subject is focused, unless the main subject moves, it would be correct for the value of the defocus amount to be zero. Furthermore, when considering the short exposure time, in the case where the main subject moves, since it is usually considered that the main subject is moving at a constant speed and in a short distance, the AF area indicating the defocus amount according to the moving object prediction equation may be regarded as indicating a correct defocus amount.

Here, an AF calculation execution range for calculating the defocus amount in the second area selection processing will be explained. In the case of a single-target, the defocus amount is calculated for each of the vertical direction and the horizontal direction in a selected AF area (AF calculation execution range). In the case of a group-target, such as a group of 5 points and a group of 9 points, the defocus amount is calculated for each of the vertical direction and the horizontal direction within the selected group-target (AF calculation execution range). In the case of an all-target (121 points), the defocus amount is calculated within the AF calculation execution range of, for example, 5×5 points centered on the AF area selected last time. An example of the AF calculation execution range in tracking AF is schematically shown in FIG. 10, and will be explained with reference thereto. In the tracking AF, for example, as shown in FIG. 10, a defocus amount within the AF calculation execution range of 3×3 points centering on a tracking coordinate CO is calculated, and the AF area is selected based on the defocus amount. In the face AF, a defocus amount within a range (face detection range) where a face exists that is detected by the face detection circuitry is calculated, and the AF area is selected based on the defocus amount. In the face AF in the second area selection processing, unlike the first area selection processing, processing specific to the face AF is not performed. In the face AF in the second area selection processing, for example, as in the case of the above-described group-target, the defocus amount is calculated for each of the vertical direction and the horizontal direction within the face detection range. However, this description does not exclude performing processing specific to the face AF in the second area selection processing.

First, in the second area selection processing according to the present embodiment, the determination unit 216b determines (first determination) whether or not a moving object prediction equation may be established. Here, the condition under which the moving object prediction equation may be established is in the case where both of the following two conditions (first condition and second condition) are satisfied. The first condition is that there is history information on the defocus amount for a certain number of points or more (for example, there is history information for 5 points or more within the past second from the current time). The second condition is that, in a state where the first condition is satisfied, there are 5 or more points in which the divergence amount from a calculated primary prediction equation is equal to or lower than a certain amount (for example, 10F$\delta$). As explained with reference to the flowcharts of FIG. 2A and FIG. 2B, as the moving object prediction equation, the result of the prediction equation calculated based on the distance measurement result up to the previous one is used. In the description of F$\delta$, F indicates FNO (also referred to as an F-number or an aperture value), $\delta$ indicates a permissible circle of confusion, and F$\delta$ generally indicates a permissible depth. Furthermore, F$\delta$ may also be described as 1F$\delta$.

The determination unit 216b then determines (second determination) whether the driving direction of the focus lens 1021 obtained from the moving object prediction equation is the close-range direction or the infinite direction. In the explanation of the present embodiment, the direction (close-range direction) in which the focus lens 1021 is driven from the infinity side toward the close-range side is defined as positive, and a case in which the focus deviation direction is on the close-range side is defined as a case in which the defocus amount is positive. Here, if the subject is moving from the infinity side to the close-range side, the inclination of the moving object prediction equation is positive when the vertical axis indicates the lens pulse position and the horizontal axis indicates time. Obviously, depending on what is to be defined as positive, positive and negative of other values, and the inclination of the moving object prediction equation, etc. will change.

In the second area selection processing according to the present embodiment, in the case where it is determined that the moving object prediction equation is established in the first determination, and the moving object prediction equation has a positive inclination in the second determination (hereinafter referred to as a first case), an AF area indicating the defocus amount closest to the moving object prediction equation is selected. As described above, the first case is a case in which, for example, the lens is driven from the infinity side to the close-range side. The first case may include a case in which the inclination of the moving object prediction equation is zero.

Figure 11:
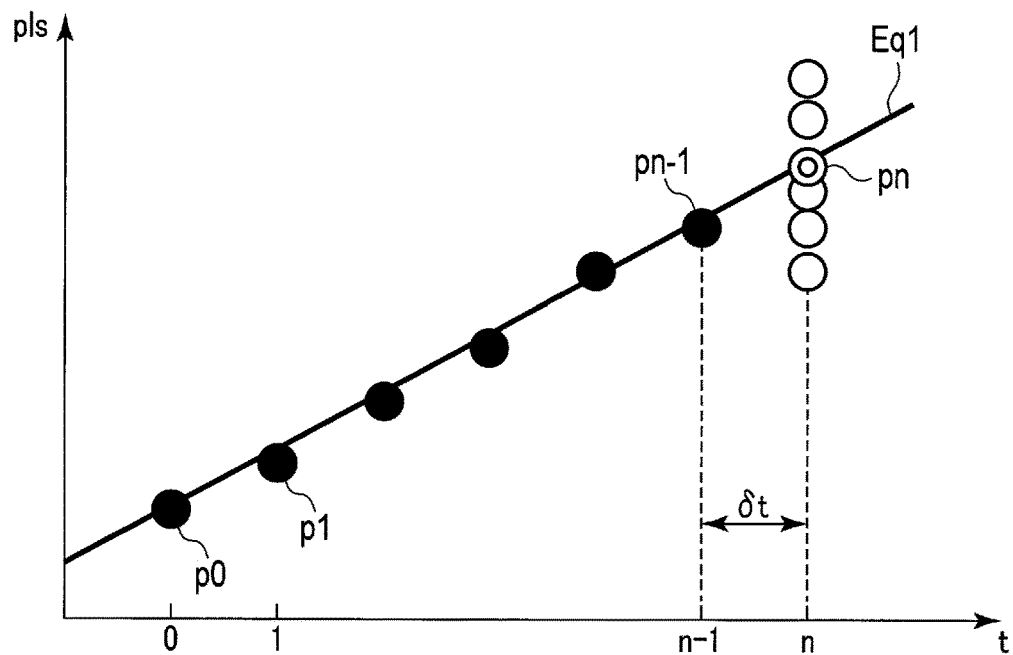
FIG. 11 is a schematic diagram showing an example of an AF area selection in a first case according to an embodiment.

An example of selecting the AF area in the first case is schematically shown in FIG. 11, and will be explained in more detail with reference thereto. In the graph of FIG. 11, the vertical axis represents the lens pulse position calculated by the processing at S112, and the horizontal axis represents time. In the graph of FIG. 11, a plot indicated by a filled circle represents the lens pulse position calculated, for example, at each timing $\delta$t, and a solid line represents a moving object prediction equation Eq1 calculated based on the history of the lens pulse position. The history includes, for example, the lens pulse positions acquired from, for example, timing $\kappa$ to timing n−1. Furthermore, plots of a plurality of non-filled circles (including double circles pn) shown in the graph of FIG. 11 represent each of the lens pulse positions calculated based on each of the defocus amounts acquired in a plurality of AF areas determined to have reliability, at a timing n at which the current second area selection processing is performed.

In the first case, among the plurality of lens pulse positions, the lens pulse position indicated by the double circle pn in FIG. 11, which is closest to the moving object prediction equation Eq1, is selected. Therefore, in the first case, among the plurality of AF areas, the AF area indicating the defocus amount used for calculating the lens pulse position is selected. In the first case, whether or not the defocus amount is positive or negative is irrelevant.

The case in which the first case does not apply will now be explained. Here, among cases in which the first case does not apply, a case in which although the moving object prediction equation is established (the first determination is satisfied), the inclination of the moving object prediction equation is negative (the driving direction of the focus lens is determined as the infinite direction in the second determination) will be explained as an example. Hereinafter, such a case is referred to as a second case. In the second case, for example, the lens is driven from the close-range side toward the infinity side. Therefore, in the second case, for example, the AF area is selected so as not to select the AF area for which the defocus amount is calculated by focusing on a background that is more on the infinity side than the main subject. Even in the case where the moving object prediction equation is not established (the first determination is not satisfied) among the cases in which the first case does not apply, the same processing as the processing related to the AF area selection performed in the second case explained below is performed. As described above in the explanation of the first determination, the case in which the moving object prediction equation is not established includes a case in which the accuracy of the moving object prediction equation is low (the precision is insufficient).

Figure 12:
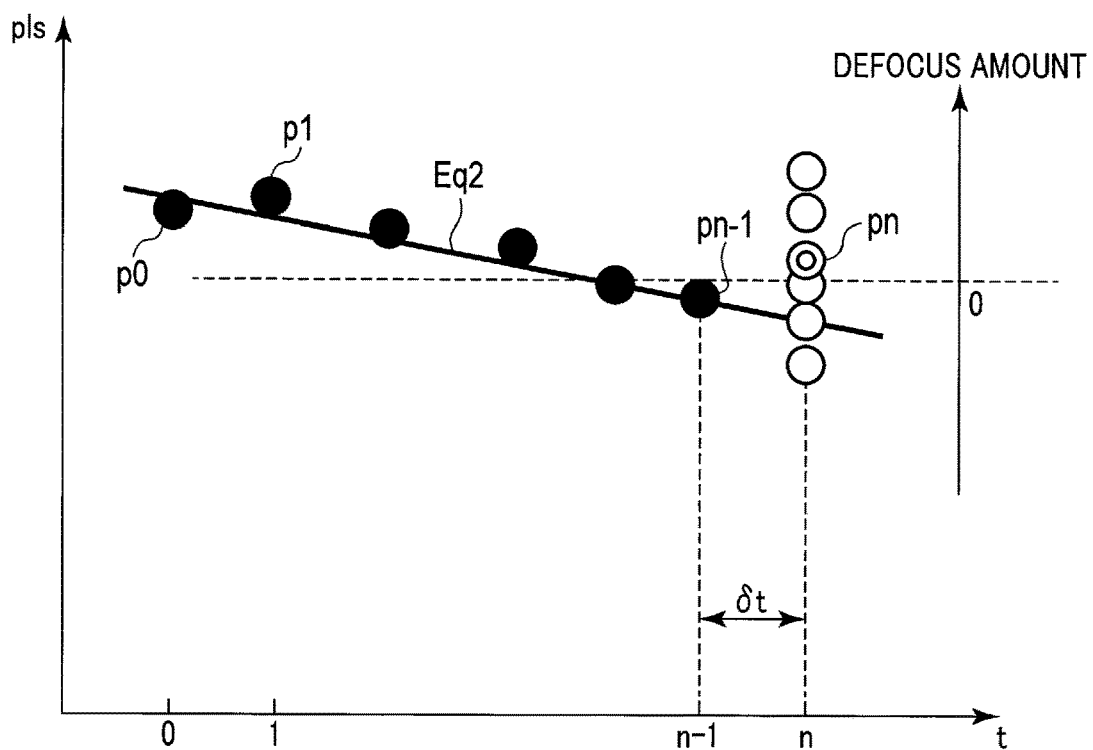
FIG. 12 is a schematic diagram showing an example of an AF area selection in a second case according to an embodiment.

An example of selecting the AF area in the second case is schematically shown in FIG. 12, and will be explained in more detail with reference thereto. In the graph of FIG. 12, the items indicated by the vertical axis and the horizontal axis, the items indicated by the type of each plot, and the items indicated by the broken line are the same as those in the graph of FIG. 11. In addition, the solid line in FIG. 12 shows a moving object prediction equation Eq2 that is calculated based on the history of the lens pulse position. In the graph of FIG. 12, the vertical axis and the axis indicating the defocus amount are described on the same plane, however, the axes are of different dimensions from each other.

In the second case, as shown in the graph of FIG. 12, although the moving object prediction equation Eq2 is established, the inclination of the moving object prediction equation Eq2 is negative. In the second case, among the AF areas indicating each of the defocus amounts used for calculating the plurality of focusing pulse positions indicated by plots of unfilled circles at the position of timing n in the graph of FIG. 12, an AF area indicating a defocus amount that satisfies one of the following two determinations (third determination, fourth determination) is selected. In the second case, regarding the defocus amount indicated by the AF area determined to have reliability, the determination unit 216b determines (third determination) whether or not a defocus amount with a positive value that satisfies a relationship of (minimum value among absolute values of defocus amount having a positive value)≤(minimum value of absolute value of defocus amount having a negative value)×constant exists. In addition, in the second case, the determination unit. 216b does not perform the face AF, however, determines (fourth determination) whether or not the sensitivity set by the sensitivity setting unit 216c is higher than a predetermined value. In the case where it is determined that the third determination or the fourth determination is satisfied, the CPU 216 selects an AF area indicating a minimum value of the positive defocus amount. Here, the sensitivity setting is a parameter that can be set by the user. A display for sensitivity setting and an operation screen, etc. are present, for example, within a normal menu screen of the camera system. In the case where there is an AF area indicating, for example, defocus amount=0, it can be considered that the defocus amount satisfies the third determination. In this manner, in the case where the second case applies, a positive defocus amount is preferentially adopted.

Figure 13:
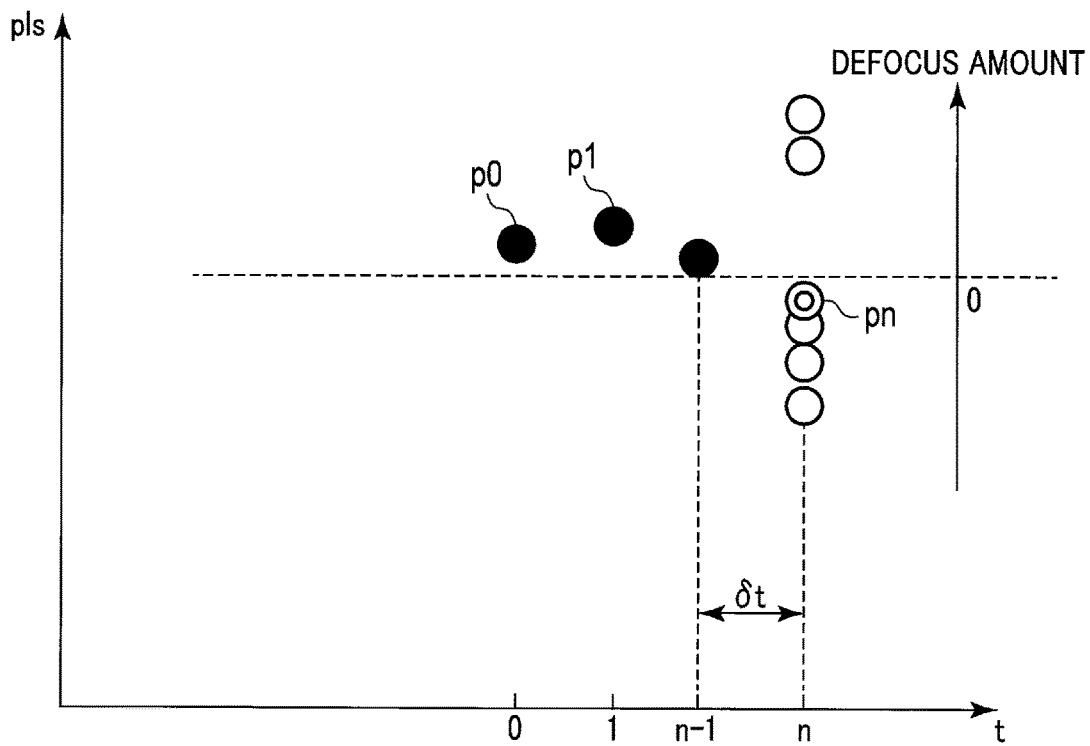
FIG. 13 is a schematic diagram showing an example of an AF area selection in a third case according to an embodiment.

Furthermore, a case in which neither the first case nor the second case apply, for example, a case in which the moving object prediction equation is not established, and the value of the defocus amount having a positive value is large (hereinafter referred to as a third case) will be explained. An example of selecting an AF area in the third case is schematically shown in FIG. 13, and will be explained in more detail with reference thereto. Items indicated by each of the vertical axis, the horizontal axis, and the axis indicating the defocus amount in the graph of FIG. 13, and items indicated by the type of each plot are the same as those in FIG. 12. In such a third case, an AF area indicating a minimum value of the absolute value of the negative defocus amount is selected.

In the second area selection according to the present embodiment, it is determined whether or not there is a defocus amount that satisfies each of the cases in the order of the first case, the second case, and the third case, so that the defocus amount having a positive value is easily adopted. The reason why the defocus amount having a positive value is made easier to be adopted is to prevent a background, which, in most cases, exist more distant than the subject, from being focused, for example, in a perspective mixed subject. Therefore, obviously, the above-described change in the order of determination, etc. performed from the viewpoint of facilitating the adoption of the positive defocus amount has the same purpose and may obtain the same effect as in the present technology.

Furthermore, the constant mentioned above in the second case is set to approximately 10 times. The reason for this is to have a positive defocus amount adopted as much as possible unless it is an extremely large positive defocus amount. Furthermore, the state of "sensitivity high" described in the second case indicates a state that is set in a manner to sensitively follow subjects, which is a state that, for example, aims to also follow subjects that suddenly accelerate, etc. The sensitivity setting is considered based on the purpose of actively adopting a value of the positive defocus amount even if the value itself is large, so that the subject coming closer from the far side may be easily followed.

<Determination on Focused State (within Focusing Range)>

Figure 14:
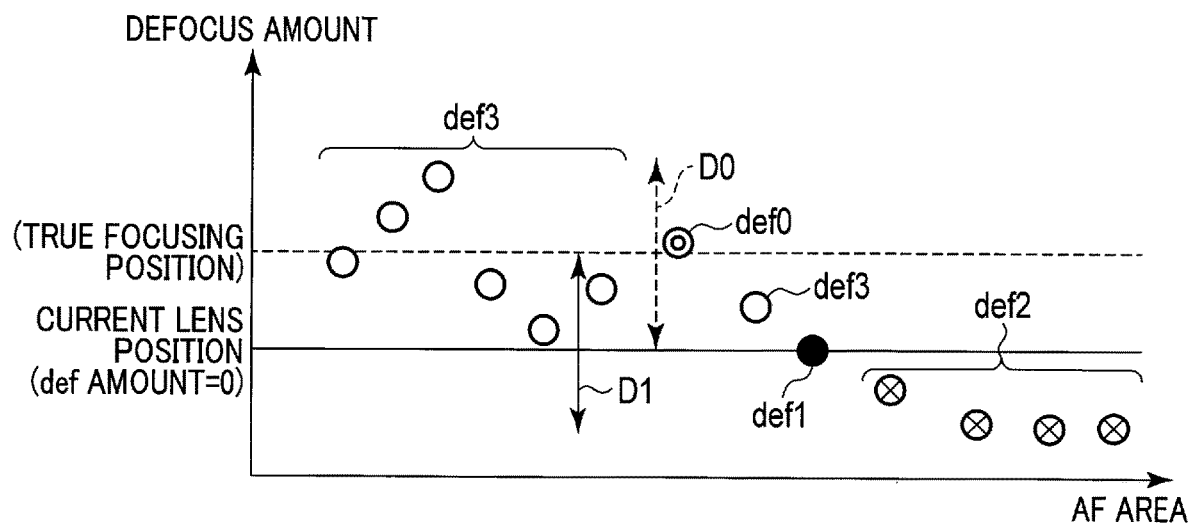
FIG. 14 is a schematic diagram showing an example of a relationship between a defocus amount distribution for an AF area and a current lens position and a true focusing position in the case where a control aiming at defocus amount=0 is performed according to an embodiment.

Here, the determination as to whether or not a focused state (within the focusing range) exists in step S108 or S117 will be explained in more detail. First of all, regarding an example of a situation required for the focusing apparatus 1 according to the present embodiment, an example of a relationship between the defocus amount distribution with respect to the AF area in the case where a control aiming at the defocus amount=0 is performed and the current lens position and the true focusing position is schematically shown in FIG. 14. The explanation will be made with reference thereto. As described above, in the face AF, an AF area selection is performed by prioritizing a face center over a closest defocus amount. Furthermore, in the following explanation, the defocus amount indicated by each AF area is considered. However, a case in which each phase difference detection direction included in each AF area may also be considered, in which naturally the same effect can be obtained.

In the graph of FIG. 14, the vertical axis represents the defocus amount and the horizontal axis represents the AF area. Each plot (def0, def1, def2, def3) in FIG. 14 represents the defocus amount calculated in each AF area. Among the plots, a double circle plot def0 indicates the defocus amount calculated in the AF area which is originally desired to be selected, a filled circle plot def1 indicates the defocus amount to be selected, a plot def2 denoted by "x" in the circle indicates the defocus amount calculated with respect to the background miscellaneous subject, and an unfilled circle plot def3 indicates other defocus amounts. In addition, in the graph of FIG. 14, a solid line shows the current lens position where the current defocus amount is zero, a broken line shows the true focusing position, an arrowed solid line D1 shows a permissible depth with respect to the current lens position, and an arrowed broken line D0 indicates a permissible depth with respect to the true focusing position. The true focusing position indicated by the broken line and the permissible depth with respect to the true focusing position indicated by the arrowed broken line D0 are values to be aimed at when preforming focus adjustment by the focusing apparatus 1; however, at the same time, are obviously unknown information that are not grasped by the focusing apparatus 1 when performing the focus adjustment.

Generally, the permissible depth in the focus determination is set to, for example, −1Fδ to +1Fδ. However, in a situation where the AF is performed on a perspective mixed subject as shown in FIG. 14, in addition to the defocus amounts of such as the plot def0, the plot def1, and the plot def3, the defocus amount calculated in accordance with the background miscellaneous subject such as the plot def2 is also included within the range of the permissible depth (indicated by the arrowed solid line D1). Therefore, when the current lens position is at a position, such as, −1Fδ from the true focusing position, due to the variation of the detected defocus amount, as the plot def1, a defocus amount of an AF area that is slightly deviated from the AF area of the plot def0, which is originally desired to be selected, is selected. Furthermore, if it is further defocused to the negative side based on the result of this selection, the lens would be driven little by little to focus on a miscellaneous subject of the background, which may not allow an AF operation to appropriately focus on the main subject.

For example, in a continuous AF (C-AF) in which AF and focusing are repeated in accordance with a moving subject, it is important to keep track of the subject normally moving forward. In the control processing of the focusing apparatus 1 according to the present embodiment, as described above with reference to FIG. 2A and FIG. 2B, the lens drive (LD) (step S120) is executed based on the result of the moving prediction calculation immediately before the main exposure (step S121).

Therefore, the focusing apparatus 1 according to the present embodiment does not necessarily have to adjust the position of the focus lens within the permissible depth while the first release is being held. Furthermore, particularly in the C-AF, since it is important not to focus on the background, as mentioned in the second area selection processing, the focusing apparatus 1 according to the present embodiment preferentially selects the defocus amount having a positive value.

Figure 15:
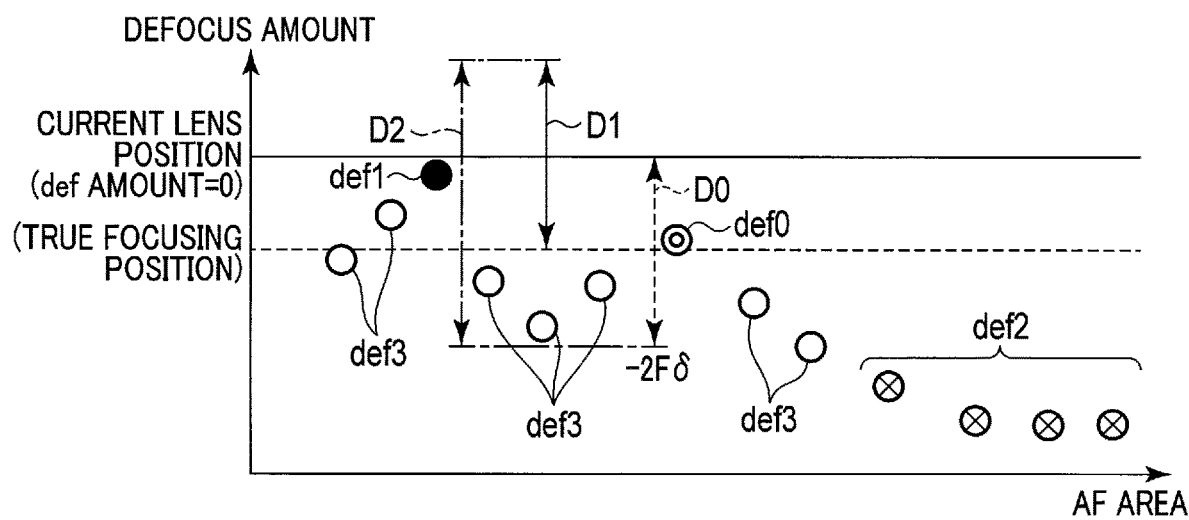
FIG. 15 is a schematic diagram showing an example of a relationship between a defocus amount distribution for an AF area and a current lens position and a true focusing position in the case where a control aiming at defocus amount=+1Fδ is performed according to an embodiment.

Therefore, in the focus lens drive in step S118, the focusing apparatus 1 according to the present embodiment performs control aiming at, for example, defocus amount+1Fδ. An example of the relationship between the defocus amount distribution for the AF area at this time and the current lens position and true focusing position is schematically shown in FIG. 15, and will be explained as follows with reference thereto. Items indicated by each of the vertical axis, the horizontal axis, the solid line, the broken line, the arrowed solid line D1, and the arrowed broken line D0 in the graph of FIG. 15, and the items indicated by the type of each plot are the same as those in the graph of FIG. 14. Furthermore, an arrowed one-dot chain line D2 indicates a permissible depth with respect to the current lens position in the case where it is aimed at defocus amount=+1Fδ.

As described above with reference to FIG. 14, particularly in the case where a defocus amount in accordance with a background miscellaneous subject is adopted in a perspective mixed subject, etc., the lens will be driven to the infinity side of the true focusing position. Therefore, as shown in FIG. 15, the focusing apparatus 1 according to the present embodiment drives the focus lens by adding an offset of, for example, "+1Fδ" as indicated by the solid line, on purpose, so that it takes a value of a positive defocus amount from a true focusing position indicated by the broken line. This can also be expressed as the focusing apparatus 1 according to the present embodiment performing focus adjustment by correcting the defocus amount indicated by the selected AF area to a positive side by a predetermined amount. As a result, since there is a variation in the detected defocus amount, the focusing apparatus 1 according to the present embodiment adopts a defocus amount (plot def1) deviated from the true focusing position by approximately +1Fδ. Therefore, in the same manner as when the lens is driven (LD) to aim at defocus amount=0, the present technology is able to avoid detecting the defocus amount in accordance with the miscellaneous subject on the background. That is, the present technology is able to avoid adopting the defocus amount of the miscellaneous subject.

As described above, the focusing apparatus 1 according to the present embodiment preferentially selects a defocus amount having a positive value in the second area selection processing, such as by performing control to aim at, for example, defocus amount=+1Fδ, and sets the focusing range of the focus determination in step S117 to expand to the negative side, such as from −2Fδ to +1Fδ. This can also be expressed as the focusing apparatus 1 according to the present embodiment performing the focus determination by correcting the threshold in the focus determination to the negative side. That is, in the perspective mixed subject, the focusing range is set within a permissible depth (arrowed one-dotted chain line D2) that may be obtained by combining a permissible depth that may be considered as corresponding to a permissible depth (arrowed broken line D0) with respect to a true focusing position and a permissible depth (arrowed solid line D1) with respect to the current lens position that is off-set driven. The lens is not driven in the range of −2Fδ, to +1Fδ with respect to the current lens position (defocus amount=0). In this manner, the present technology is able to select an appropriate AF area for calculating a defocus amount in accordance with the main subject by making it difficult to select the AF area indicating a defocus amount in accordance with a background miscellaneous subject while suppressing the lens from being driven in the negative direction toward the background.

For example, when executing C-AF, etc., the focusing apparatus 1 according to the present embodiment selects the closest defocus amount among the defocus amounts indicated by the AF areas from immediately after the first release is pressed until the focus determination is performed. Furthermore, while the first release is pressed or during continuous shooting, the focusing apparatus 1 according to the present embodiment selects an AF area having the smallest defocus amount or an AF area indicating a defocus amount closest to the moving object prediction calculation by the first to fourth determinations. Furthermore, the focusing apparatus 1 according to the present embodiment performs control aiming at, for example, defocus amount=+1Fδ in the focus determination.

In this manner, the focusing apparatus 1 according to the present embodiment is able to prevent selecting an AF area indicating a defocus amount in accordance with a background miscellaneous subject. Therefore, by applying the present technology, even in the case of photographing a perspective mixed subject, a main subject indicating a closest defocus amount may be captured immediately after the first release is pressed, and an AF area indicating a defocus amount corresponding to the main subject, and not a background miscellaneous subject, can be appropriately selected.

Modification

The defocus amount of one AF area so far has been explained as indicating the two distance measurement results of the vertical direction and the horizontal direction; however, the present invention is not limited thereto. The defocus amount may be subdivided to a further extent in the vertical direction and the horizontal direction. For example, there may be a case in which three defocus amounts are calculated in the vertical direction, and three defocus amounts are calculated in the horizontal direction. In the case of dividing the vertical direction and the horizontal direction further into three parts as in the manner described above, there may be a case in which, for example, one AF area is divided into three positions, and the defocus amount is calculated in the three blocks of L, C, and R in each AF area. In this case as well, it is needless to say that the present technology can realize the AF area selection by handling the AF area as 121×2 (vertical and horizontal)×3 blocks.

However, in the case of calculating the defocus amount by further dividing the AF area in the above manner, the calculation amount of the defocus amount increases together with the calculation time. In order to shorten the calculation time, for example, when performing block selection, the block selection should be performed in the state of the two-image interval value, which is prior to the conversion to the defocus amount and applying various correction values. In this case, however, since the result of moving object prediction cannot be obtained, the following determination processing is performed.

At this time, a determination unit 216b performs determination (fifth determination) on whether or not the two-image interval value having a positive value satisfying the relation of (minimum value of absolute value of positive two-image interval value)≤(minimum value of absolute value of negative two-image interval value×constant) exists. In the case where a two-image interval value satisfying the fifth determination exists, a block indicating the two-image interval value is selected. On the other hand, in the case where a two-image interval value that satisfies the fifth determination does not exist, a block indicating a minimum value of an absolute value of a negative two-image interval value is selected.

According to at least one embodiment described above, it is possible to provide a focusing apparatus capable of selecting an appropriate autofocus (AF) area and performing AF, a control method of the focusing apparatus, and a recording medium storing a focus adjustment program.

A change of the order of the processing or the steps in each processing illustrated by the flowcharts is possible. Addition or deletion of a processing or a step is also possible. The processing is executed by the corresponding programs stored in the interchangeable lens 100 or inside the camera body 200. Each of the programs may be stored in advance in the interchangeable lens 100, inside the camera body 200, or in another storage medium. The programs may be stored in various ways; they may be stored before shipment, may be stored in a distributed storage medium, or may be stored through a communication line, such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focusing apparatus detecting a defocus amount repeatedly for each of a plurality of AF areas and selecting an AF area based on the defocus amount to perform focus adjustment, wherein
the focusing apparatus comprises processing circuitry that is configured to:
calculate a moving object prediction equation based on a history of a plurality of the repeatedly detected defocus amounts;
perform a first determination as to whether or not the moving object prediction equation may be established, the moving object prediction equation being determined as being established when a divergence amount between a plurality of the defocus amounts equal to or larger than a predetermined number within a past predetermined time from a current time included in the history and the calculated moving object prediction equation is equal to or lower than a predetermined value, and a second determination as to whether a driving direction of a focus lens for keeping track of a moving subject calculated from the moving object prediction equation is a close-range direction or an infinite direction; and
in a case where the moving object prediction equation is determined as being established in the first determination, and the driving direction is determined as being the close-range direction in the second determination, select an AF area indicating a defocus amount closest to the moving object prediction equation among the latest defocus amounts detected for the plurality of AF areas.

2. The focusing apparatus according to claim 1, wherein the processing circuitry further performs a third determination as to whether or not a defocus amount that is a minimum value of an absolute value of a positive defocus amount, and is a defocus amount smaller than a predetermined factor of times of a minimum value of an absolute value of a negative defocus amount exists among the plurality of detected defocus amounts, or as to whether or not the positive defocus amount is sufficiently small, and, in which case precision of the moving object prediction equation is insufficient in the second determination, or in which case the driving direction is determined as an infinite direction in the second determination, the processing circuitry selects an AF area that indicates the defocus amount satisfying the third determination.

3. The focusing apparatus according to claim 2, wherein, in a case where the defocus amount that satisfies the third determination does not exist when the moving object prediction equation is determined as not being established in the first determination or when the driving direction is determined as the infinite direction in the second determination, the processing circuitry selects an AF area indicating the minimum value of the absolute value of the negative defocus amount.

4. The focusing apparatus according to claim 1, further comprising a focusing instruction unit that instructs a start of focus adjustment, wherein
the processing circuitry selects an AF area indicating a maximum value of a positive defocus amount among the plurality of defocus amounts until an instruction to start focus adjustment is issued from the focusing instruction unit, or until a focus determination is once made after the start instruction is issued.

5. The focusing apparatus according to claim 1, wherein the processing circuitry further sets a sensitivity of focus adjustment, and, in a case where the set sensitivity is higher than a predetermined value, preferentially selects an AF area indicating a positive defocus amount among the plurality of defocus amounts.

6. The focusing apparatus according to claim 1, further comprising tracking circuitry for tracking a subject, wherein
the processing circuitry selects an AF area based on a defocus amount indicated by the AF area within a predetermined range centered on a tracking position of the tracking circuitry.

7. The focusing apparatus according to claim 1, further comprising face detection circuitry for detecting a face, wherein
the processing circuitry selects an AF area based on a defocus amount indicated by the AF area within a range of a face detected by the face detection circuitry.

8. The focusing apparatus according to claim 7, further comprising:
a focusing instruction unit that instructs a start of focus adjustment;
a reliability determination circuitry that determines reliability regarding the detection of the defocus amount; and
pupil detection circuitry that detects a pupil within the range of the face detected by the face detection circuitry, wherein
the processing circuitry selects an AF area corresponding to a position of a pupil within the range of the face among the plurality of defocus amounts, or an AF area with high reliability until an instruction to start focus adjustment is issued from the focusing instruction unit, or until a focus determination is once made after the start instruction is issued.

9. The focusing apparatus according to claim 1, further comprising a focusing instruction unit that instructs a start of focus adjustment, wherein
the processing circuitry performs the focus adjustment by correcting the defocus amount indicated by the selected AF area to a positive side by a predetermined amount.

10. The focusing apparatus according to claim 1, further comprising a focusing instruction unit that instructs a start of focus adjustment, wherein
the processing circuitry performs focus determination by correcting a threshold for the focus determination to a negative side.

11. The focusing apparatus according to claim 1, further comprising a storage unit that stores an optical correction amount relating to a defocus amount, wherein
the processing circuitry calculates the moving object prediction equation based on a history of a defocus amount obtained by correcting the detected defocus amount by the optical correction amount, and selects an AF area based on the corrected defocus amount.

12. The focusing apparatus according to claim 1, wherein the processing circuitry further performs evaluation of accuracy of the moving object prediction equation in addition to the first determination.

13. A method for controlling a focusing apparatus, the focusing apparatus detecting a defocus amount repeatedly for each of a plurality of AF areas and selecting an AF area based on the defocus amount to perform focus adjustment, the method comprising:
calculating a moving object prediction equation based on a history of a plurality of the repeatedly detected defocus amounts;
performing a first determination as to whether or not the moving object prediction equation is established, the moving object prediction equation being determined as being established when a divergence amount between a plurality of the defocus amounts equal to or larger than a predetermined number within a past predetermined time from a current time included in the history and the calculated moving object prediction equation is equal to or lower than a predetermined value, and a second determination as to whether a driving direction of a focus lens for keeping track of a moving subject calculated from the moving object prediction equation is a close-range direction or an infinite direction; and
in a case where the moving object prediction equation is determined as being established in the first determination, and the driving direction is determined as the close-range direction in the second determination, selecting an AF area indicating a defocus amount closest to the moving object prediction equation among the latest defocus amounts detected for the plurality of AF areas.

14. The method according to claim 13, further comprising performing a third determination as to whether or not a defocus amount that is a minimum value of an absolute value of a positive defocus amount, and is a defocus amount smaller than a predetermined factor of times of a minimum value of an absolute value of a negative defocus amount exists among the detected plurality of defocus amounts, or as to whether or not the positive defocus amount is sufficiently small, wherein
the selecting the AF area further includes, in a case where precision of the moving object prediction equation is insufficient in the second determination, or in a case where the driving direction is determined as an infinite direction in the second determination, selecting an AF area that indicates the defocus amount satisfying the third determination.

15. The method according to claim 14, wherein the selecting the AF area further includes, in a case where the defocus amount that satisfies the third determination does not exist in a case where the moving object prediction equation is determined as not being established in the first determination, or in a case where the driving direction is determined as the infinite direction in the second determination, selecting an AF area that indicates the minimum value of the absolute value of the negative defocus amount.

16. The method according to claim 13, further comprising starting focus adjustment in response to an instruction to start focus adjustment, wherein
the selecting the AF area further includes selecting an AF area indicating a maximum value of a positive defocus amount among the plurality of defocus amounts until a start of focus adjustment is instructed, or until a focus determination is once made after the start instruction is issued.

17. The method according to claim 13, further comprising setting a sensitivity of focus adjustment, wherein
the selecting the AF area includes preferentially selecting an AF area indicating a positive defocus amount among the plurality of defocus amounts in a case where the set sensitivity is higher than a predetermined value.

18. A computer-readable non-transitory storage medium storing a focus adjustment program for causing a computer to repeatedly detect a defocus amount for each of a plurality of AF areas, and to select the AF area used for focus adjustment based on the defocus amount, wherein the focus adjustment program comprises:
calculating a moving object prediction equation based on a history of a plurality of the repeatedly detected defocus amounts;
performing a first determination as to whether or not the moving object prediction equation is satisfied, the moving object prediction equation being determined as being established when a divergence amount between a plurality of the defocus amounts equal to or larger than a predetermined number within a past predetermined time from a current time included in the history and the calculated moving object prediction equation is equal to or lower than a predetermined value, and a second determination as to whether a driving direction of a focus lens for keeping track of a moving subject calculated from the moving object prediction equation is a close-range direction or an infinite direction; and
in a case where the moving object prediction equation is determined as being established in the first determination, and the driving direction is determined as the close-range direction in the second determination, selecting an AF area indicating a defocus amount closest to the moving object prediction equation among the latest defocus amounts detected for the plurality of AF areas.

19. The computer-readable non-transitory storage medium storing the focus adjustment program according to claim 18, wherein
the focus adjustment program further includes performing a third determination as to whether or not a defocus amount that is a minimum value of an absolute value of a positive defocus amount, and is a defocus amount smaller than a predetermined factor of times of a minimum value of an absolute value of a negative defocus amount exists among the plurality of detected defocus amounts, or as to whether or not the positive defocus amount is sufficiently small, wherein
the selecting the AF area further includes, in a case where precision of the moving object prediction equation is insufficient in the second determination, or in a case where the driving direction is determined as an infinite direction in the second determination, selecting an AF area that indicates the defocus amount satisfying the third determination.

20. The computer-readable non-transitory storage medium storing the focus adjustment program according to claim 19, wherein the selecting the AF area further includes, in a case where the defocus amount that satisfies the third determination does not exist in a case where the moving object prediction equation is determined as not being established in the first determination, or in a case where the driving direction is determined as the infinite direction in the second determination, selecting an AF area that indicates the minimum value of the absolute value of the negative defocus amount.

* * * * *